US011678006B2

(12) United States Patent
Hinckley et al.

(10) Patent No.: US 11,678,006 B2
(45) Date of Patent: Jun. 13, 2023

(54) MULTIPLE DEVICE CONTENT MANAGEMENT

(71) Applicant: Microsoft Technology Licensing, LLC, Redmond, WA (US)

(72) Inventors: Kenneth Paul Hinckley, Kirkland, WA (US); Michel Pahud, Kirkland, WA (US); Nathalie Maryline Riche, Issaquah, WA (US); William Arthur Stewart Buxton, Toronto (CA); Nicolai Marquardt, Stevenage (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/350,233

(22) Filed: Jun. 17, 2021

(65) Prior Publication Data
US 2022/0408142 A1      Dec. 22, 2022

(51) Int. Cl.
*H04N 21/43*      (2011.01)
*H04N 21/41*      (2011.01)
*G06F 1/16*      (2006.01)
*G09G 5/12*      (2006.01)

(52) U.S. Cl.
CPC ......... *H04N 21/4307* (2013.01); *G06F 1/166* (2013.01); *G06F 1/1607* (2013.01); *G06F 1/1649* (2013.01); *G06F 1/1694* (2013.01); *G09G 5/12* (2013.01); *H04N 21/4122* (2013.01); *H04N 21/4126* (2013.01)

(58) Field of Classification Search
CPC ........... H04N 21/4307; H04N 21/4122; H04N 21/4126; G06F 1/1607; G06F 1/1649; G06F 1/1694; G09G 5/12

USPC ...................................................... 375/240.28
See application file for complete search history.

(56) References Cited

U.S. PATENT DOCUMENTS

| | | | |
|---|---|---|---|
| 8,046,701 B2* | 10/2011 | Chiu | G06F 3/04883 715/761 |
| 9,929,817 B2 | 3/2018 | Holz et al. | |
| 9,983,771 B2 | 5/2018 | Martin et al. | |
| 10,031,549 B2 | 7/2018 | Costa | |
| 10,747,264 B1* | 8/2020 | Knoppert | G06F 1/1677 |
| 2007/0146347 A1 | 6/2007 | Rosenberg | |

(Continued)

FOREIGN PATENT DOCUMENTS

| CN | 207427259 U | 5/2018 |
|---|---|---|
| WO | 2015096930 A1 | 7/2015 |

OTHER PUBLICATIONS

"SurroundWeb: Spreading the Web to Multiple Screens", Retrieved from: https://www.youtube.com/watch?v=MuYHV0bFalg, Apr. 18, 2014, 4 Pages.

(Continued)

*Primary Examiner* — Dominic D Saltarelli
(74) *Attorney, Agent, or Firm* — Rainier Patents, P.S.

(57) ABSTRACT

The description relates to cooperatively controlling devices based upon their location and pose. One example can receive first sensor data associated with a first device and second sensor data associated with a second device. This example can analyze the first sensor data and the second sensor data to determine relative locations and poses of the first device relative to the second device and can supply the locations and poses to enable content to be collectively presented across the devices based upon the relative locations and poses.

20 Claims, 23 Drawing Sheets

(56) References Cited

U.S. PATENT DOCUMENTS

| | | | |
|---|---|---|---|
| 2014/0123038 A1 | 5/2014 | Ahn et al. | |
| 2014/0365927 A1* | 12/2014 | Sakai | G06F 3/0488 715/764 |
| 2015/0153928 A1* | 6/2015 | Chen | G06F 1/1694 715/863 |
| 2016/0112279 A1* | 4/2016 | Kalanithi | G06F 3/03 715/736 |
| 2016/0140933 A1* | 5/2016 | Pitis | G06F 3/0484 345/173 |
| 2016/0142471 A1* | 5/2016 | Tse | G09B 5/12 715/753 |
| 2019/0310763 A1 | 10/2019 | Sirpal et al. | |
| 2020/0059754 A1* | 2/2020 | Carter | H04B 5/0043 |
| 2020/0356221 A1* | 11/2020 | Behzadi | H04M 1/72454 |
| 2021/0210051 A1* | 7/2021 | Wang | G06K 7/1417 |
| 2021/0247019 A1* | 8/2021 | Newville | F16M 13/02 |
| 2022/0093064 A1* | 3/2022 | Huang | H04N 5/23216 |

OTHER PUBLICATIONS

"Tablet Holder, Adjustable Flexible Desk Mount (Manufactured by UGREEN)", Retrieved from: https://www.amazon.co.uk/UGREEN-Gooseneck-Flexible-AdjustableNintendo/dp/B076HJVSC3, Retrieved Date: Jan. 11, 2018, 16 Pages.

Bailly, et al., "LivingDesktop: Augmenting Desktop Workstation with Actuated Devices", In Proceedings of the CHI Conference on Human Factors in Computing Systems. Association for Computing Machinery, May 7, 2016, pp. 5298-5310.

Biehl, et al., "ARIS: An Interface for Application Relocation in an Interactive Space", In Proceedings of Graphics interface, May 17, 2004, pp. 1-10.

Brudy, et al., "Cross-Device Taxonomy: Survey, Opportunities and Challenges of Interactions Spanning Across Multiple Devices", In Proceedings of the CHI Conference on Human Factors in Computing Systems, May 4, 2019, pp. 1-28.

Brudy, et al., "Investigating the Role of an Overview Device in Multi-Device Collaboration", In Proceedings of the CHI Conference on Human Factors in Computing Systems, Apr. 21, 2018, pp. 1-13.

Brudy, et al., "SurfaceFleet: Exploring Distributed Interactions Unbounded from Device, Application, User, and Time", In Proceedings of the 33rd Annual ACM Symposium on User Interface Software and Technology, Oct. 20, 2020, pp. 7-21.

Casiez, et al., "1e Filter: A Simple SpeedBased Low-Pass Filter for Noisy Input in Interactive Systems", In Proceedings of the SIGCHI Conference on Human Factors in Computing Systems, May 5, 2012, pp. 2527-2530.

Chen, et al., "Graduate Student Use of a Multi-Slate Reading System", In Proceedings of the SIGCHI Conference on Human Factors in Computing Systems, Apr. 27, 2013, pp. 1799-1808.

Chokshi, et al., "ePlan Multi-Surface: A Multi-Surface Environment for Emergency Response Planning Exercises", In Proceedings of the Ninth ACM International Conference on Interactive Tabletops and Surfaces, Nov. 16, 2014, pp. 219-228.

Coughlan, et al., "The Conceptual Framing, Design and Evaluation of Device Ecologies for Collaborative Activities", In International Journal of Human-Computer Studies, vol. 70, Issue 10, Oct. 1, 2012, pp. 1-22.

Czernuszenko, et al., "The ImmersaDesk and Infinity Wall Projection-Based Virtual Reality Displays", In ACM SIGGRAPH Computer Graphics, vol. 31, Issue 2, May 1, 1997, pp. 46-49.

Dearman, et al., "Determining the Orientation of Proximate Mobile Devices using their Back Facing Camera", In Proceedings of the SIGCHI Conference on Human Factors in Computing Systems, May 5, 2012, 4 Pages.

Dietz, et al., "DiamondTouch: a Multi-user Touch Technology", In Proceedings of the 14th annual ACM symposium on User interface software and technology, Nov. 11, 2001, pp. 219-226.

Everitt, et al., "MultiSpace: Enabling Electronic Document Micro-Mobility in Table-Centric, Multi-Device Environments.-", In Proceedings of First IEEE International Workshop on Horizontal Interactive Human-Computer Systems, Jan. 5, 2006, 10 Pages.

Fitzmaurice, et al., "Bricks: Laying the Foundations for Graspable User Interfaces", In Proceedings of the SIGCHI conference on Human factors in computing systems, May 1995, pp. 442-449.

Fitzmaurice, et al., "Sentient Data Access via a Diverse Society of Devices: Today’s Ubiquitous Computing Environment Cannot Benefit from the Traditional Understanding of a Hierarchical File System.-", In Journal of Queue, vol. 1, Issue 8, Nov. 2003, pp. 53-63.

Goguey, et al., "PickCells: A Physically Reconfigurable Cell-Composed Touchscreen", In Proceedings of the CHI Conference on Human Factors in Computing Systems, May 2, 2019, pp. 1-14.

Greenberg, et al., "Proxemic Interactions: The New Ubicomp?", In Journal of Interactions, Jan. 2011, pp. 44-50.

Greenberg, et al., "Using Digital but Physical Surrogates to Mediate Awareness, Communication and Privacy in Media Spaces", In Personal Technologies, vol. 3, Issue 4, Dec. 1, 1999, 17 Pages.

Grønbæk, et al., "KirigamiTable: Designing for Proxemic Transitions with a Shape-Changing Tabletop", In Proceedings of the CHI Conference on Human Factors in Computing Systems, Apr. 21, 2020, pp. 1-15.

Grønbæk, et al., "Proxemic Transitions: Designing ShapeChanging Furniture for Informal Meetings", In Proceedings of the CHI Conference on Human Factors in Computing Systems, May 2, 2017, pp. 7029-7041.

Grubert, et al., "HeadPhones: Ad Hoc Mobile Multi-Display Environments Through Head Tracking", In Proceedings of the CHI Conference on Human Factors in Computing Systems, May 2, 2017, pp. 3966-3971.

Grudin, Jonathan, "Partitioning Digital Worlds: Focal and Peripheral Awareness in Multiple Monitor Use", In Proceedings of the SIGCHI Conference on Human Factors in Computing Systems, Mar. 31, 2001, pp. 458-465.

Hall, Edward T., "The Hidden Dimension (1st ed. ed.).", In Publications of Doubleday, Garden City, N.Y, 1966, 39 Pages.

Hamilton, et al., "Conductor: Enabling and Understanding Cross-Device Interaction", In Proceedings of the SIGCHI conference on Human factors in computing Privileged and Confidential systems, Apr. 26, 2014, pp. 2773-2882.

Hinckley, et al., "Codex: A Dual Screen Tablet Computer", In Proceedings of the SIGCHI Conference on Human Factors in Computing Systems, Apr. 9, 2009, pp. 1933-1942.

Hinckley, et al., "Stitching: Pen Gestures That Span Multiple Displays", In Proceedings of the working conference on Advanced visual interfaces, May 25, 2004, pp. 23-31.

Houben, et al., "ActivitySpace: Managing Device Ecologies in an Activity-Centric Configuration Space", In Proceedings of the Ninth ACM International Conference on Interactive Tabletops and Surfaces, Nov. 16, 2014, pp. 119-128.

Houben, et al., "WatchConnect: A Toolkit for Prototyping Smartwatch-Centric Cross-Device Applications", In Proceedings of the 33rd annual ACM conference on human factors in computing systems, Apr. 18, 2015, pp. 1247-1256.

Ishii, et al., "ClearBoard: A Seamless Medium for Shared Drawing and Conversation with Eye Contact", In Proceedings of the SIGCHI conference on Human factors in computing systems, May 3, 1992, pp. 525-532.

Ishii, et al., "Tangible Bits: Towards Seamless Interfaces between People, Bits and Atoms", In Proceedings of the ACM SIGCHI Conference on Human factors in computing systems, Mar. 27, 1997, pp. 234-241.

Izadi, et al., "Dynamo: A Public Interactive Surface Supporting the Cooperative Sharing and Exchange of Media", In Proceedings of the 16th annual ACM symposium on User interface software and technology, Nov. 2, 2003, pp. 159-168.

Jin, et al., "Tracko: Ad-Hoc Mobile 3D Tracking Using Bluetooth Low Energy and Inaudible Signals for Cross-Device Interaction", In Proceedings of the 28th Annual ACM Symposium on User Interface Software & Technology, Nov. 5, 2015, pp. 147-156.

(56) References Cited

OTHER PUBLICATIONS

Kim, et al., "UbiWall as a Reconfigurable Ecosystem of Smart Blocks", In Proceedings of 5th IEEE International Conference on Digital Ecosystems and Technologies, May 31, 2011, pp. 95-100.

Kirsh, et al., "The Intelligent Use of Space", In Journal of Artificial Intelligence 73, vol. 1, Feb. 1995, pp. 31-68.

Kohtake, et al., "U-Texture: Self-Organizable Universal Panels for Creating Smart Surroundings", In Proceedings of International Conference on Ubiquitous Computing, Sep. 11, 2005, pp. 19-36.

Koppel, et al., "Chained Displays: Configurations of Public Displays Can Be Used to Influence Actor, Audience-, and Passer-by Behavior", In Proceedings of the SIGCHI Conference on Human Factors in Computing Systems, May 5, 2012, pp. 317-326.

Kudo, et al., "AdapTable: Extending Reach over Large Tabletops through Flexible Multi-Display Configuration", In Proceedings of the ACM International Conference on Interactive Surfaces and Spaces, Nov. 19, 2018, pp. 213-225.

Kuzuoka, et al., "Agora: A Remote Collaboration System That Enables Mutual Monitoring", In Proceedings of extended abstracts on Human factors in computing systems, May 15, 1999, pp. 190-191.

Lapides, et al., "The 3D Tractus: A Three-Dimensional Drawing Board", In Proceedings of First IEEE International Workshop on Horizontal Interactive Human-Computer Systems, Aug. 26, 2005, 9 Pages.

Lee, et al., "Socio-Spatial Comfort: Using Vision-Based Analysis to Inform User-Centred Human-Building Interactions", In Proceedings of the ACM on Human-Computer Interaction, Dec. 2020, 33 Pages.

Leitner, et al., "Flux: A Tilting Multi-Touch and Pen Based Surface", In Proceedings of CHI Extended Abstracts on Human Factors in Computing Systems, Apr. 4, 2009, pp. 3211-3216.

Lucero, et al., "Mobile Collocated Interactions: Taking an Offline Break Together", In Journal of Interactions, vol. 20, Issue 2, Mar. 2, 2013, pp. 26-32.

Lucero, et al., "Pass-Them-around: Collaborative Use of Mobile Phones for Photo Sharing", In Proceedings of the SIGCHI conference on human factors in computing systems, May 7, 2011, pp. 1787-1796.

Marquardt, et al., "Cross-Device Interaction via Micro-Mobility and F-Formations", In Proceedings of the 25th annual ACM symposium on User interface software and technology, Oct. 7, 2012, pp. 13-22.

Marquardt, et al., "Gradual Engagement: Facilitating Information Exchange between Digital Devices as a Function of Proximity", In Proceedings of the ACM international conference on Interactive tabletops and surfaces, Nov. 11, 2012, pp. 31-40.

Marquardt, et al., "SurfaceConstellations: A Modular Hardware Platform for Ad-Hoc Reconfigurable Cross-Device Workspaces", In Proceedings of the CHI Conference on Human Factors in Computing Systems, Apr. 21, 2018, pp. 1-14.

Marquardt, et al., "The Proximity Toolkit: Prototyping Proxemic Interactions in Ubiquitous Computing Ecologies", In Proceedings of the 24th annual ACM symposium on User interface software and technology, Oct. 16, 2011, pp. 315-325.

Marshall, et al., "Using F-Formations to Analyse Spatial Patterns of Interaction in Physical Environments", In Proceedings of the ACM conference on Computer supported cooperative work, Mar. 19, 2011, pp. 445-454.

Teevan, et al., "The New Future of Work: Research from Microsoft on the Impact of the Pandemic on Work Practices", In Publication of Microsoft-MSR-TR-2021, Jan. 2021, 65 Pages.

Ullmer, et al., "The metaDESK: Models and Prototypes for Tangible User Interfaces", In Proceedings of the 10th Annual ACM Symposium on User Interface Software and Technology, Oct. 14, 1997, pp. 1-10.

Voelker, et al., "Dynamic Portals: A Lightweight Metaphor for Fast Object Transfer on Interactive Surfaces", In Proceedings of the ACM International Conference on Interactive Tabletops and Surfaces, Nov. 13, 2011, pp. 158-161.

Merrill, et al., Siftables: Towards Sensor Network User Interfaces, In Proceedings of the 1st international conference on Tangible and embedded interaction, Feb. 15, 2007, pp. 75-78.

Ortega, et al., "BEXHI: A Mechanical Structure for Prototyping Bendable and EXpandable Handheld Interfaces", In Proceedings of the ACM International Conference on Interactive Surfaces and Spaces, Nov. 10, 2019, pp. 269-273.

Paay, et al., "A Comparison of Techniques For Cross-Device Interaction From Mobile Devices To Large Displays", In Journal of Mobile Multimedia, vol. 12, Issue 3&4, Apr. 2, 2017, pp. 243-264.

Perteneder, et al., Foxels: Build Your Own Smart Furniture, In Proceedings of the Fourteenth International Conference on Tangible, Embedded, and Embodied Interaction, Feb. 9, 2020, pp. 111-122.

Rädle, et al., HuddleLamp: Spatially-Aware Mobile Displays for Ad-Hoc Around-the-Table Collaboration, In Proceedings of the Ninth ACM International Conference on Interactive Tabletops and Surfaces, Nov. 16, 2014, pp. 45-54.

Rädle, et al., PolarTrack: Optical Outside-In Device Tracking That Exploits Display Polarization, In Proceedings of the CHI Conference on Human Factors in Computing Systems, Apr. 21, 2018, pp. 1-9.

Rekimoto, Jun., Pick-and-Drop: A Direct Manipulation Technique for Multiple Computer Environments, In Proceedings of the 10th annual ACM symposium on User interface software and technology, Oct. 1, 1997, pp. 31-39.

Rekimoto, et al., Proximal Interactions: A Direct Manipulation Technique for Wireless Networking, In Journal of Interact, vol. 3, Sep. 2003, pp. 1-8.

Rendl, et al., "FlexCase: Enhancing Mobile Interaction with a Flexible Sensing and Display Cover", In Proceedings of the CHI Conference on Human Factors in Computing Systems, May 7, 2016, pp. 5138-5150.

Rodden, et al., Designing Novel Interactional Workspaces to Support Face to Face Consultations, In Proceedings of the SIGCHI conference on Human factors in computing systems, vol. 5, Issue 1, Apr. 5, 2003, pp. 57-64.

Romat, et al., "Tilt-Responsive Techniques for Digital Drawing Boards", In Proceedings of the 33rd Annual ACM Symposium on User Interface Software and Technology, Oct. 20, 2020, pp. 500-515.

Schreiner, et al., Connichiwa: A Framework for Cross-Device Web Applications, In Proceedings of the 33rd Annual ACM Conference Extended Abstracts on Human Factors in Computing Systems, Apr. 18, 2015, pp. 2163-2168.

Schwarz, et al., Phone As a Pixel: Enabling Ad-Hoc, Large-Scale Displays Using Mobile Devices, In Proceedings of the SIGCHI Conference on Human factors in Computing Systems, May 5, 2012, pp. 2235-2238.

Seifert, et al., Hover Pad: Interacting with Autonomous and Self-Actuated Displays in Space, In Proceedings of the 27th annual ACM symposium on User interface software and technology, Oct. 5, 2014, pp. 139-147.

Seyed, et al., "Doppio: A Reconfigurable Dual-Face Smartwatch for Tangible Interaction", In Proceedings of the 2016 CHI Conference on Human Factors in Computing Systems, May 7, 2016, pp. 4675-4686.

Spindler, et al., "PaperLens: Advanced Magic Lens Interaction above the Tabletop", In Proceedings of the ACM International Conference on Interactive Tabletops and Surfaces, Nov. 23, 2009, pp. 69-76.

Streitz, et al., "I-LAND: An Interactive Landscape for Creativity and Innovation", In Proceedings of the SIGCHI conference on Human factors in computing systems, May 15, 1999, pp. 120-127.

Tandler, et al., "Connectables: Dynamic Coupling of Displays for the Flexible Creation of Shared Workspaces", In Proceedings of the 14th annual ACM symposium on User interface software and technology, Nov. 11, 2001, pp. 11-20.

Tang, et al., "Three's Company: Understanding Communication Channels in Three-Way Distributed Collaboration", In Proceedings of the ACM conference on Computer supported cooperative work, Feb. 6, 2010, pp. 271-280.

(56) References Cited

OTHER PUBLICATIONS

Tomfelde, et al., "Tilted Tabletops: In between Horizontal and Vertical Workspaces", In Proceedings of IEEE International Workshop on Horizontal Interactive Human Computer Systems, Aug. 2008, pp. 1-8.
Tsang, et al., "Boom Chameleon: Simultaneous Capture of 3D Viewpoint, Voice and Gesture Annotations on a Spatially-Aware Display", In Proceedings of the 15th annual ACM symposium on User interface software and technology, vol. 4, Issue 2, Oct. 27, 2002, pp. 111-120.
Vermeulen, et al., "Crossing the Bridge over Norman's Gulf of Execution: Revealing Feedforward's True Identity", In Proceedings of the SIGCHI Conference on Human Factors in Computing Systems, Apr. 27, 2013, pp. 1931-1940.
Voelker, et al., "GazeConduits: Calibration-Free Cross-Device Collaboration through Gaze and Touch", In Proceedings of the CHI Conference on Human Factors in Computing Systems, Apr. 25, 2020, pp. 1-10.
Weiss, et al., "BendDesk: Dragging Across the Curve", In Proceedings of ACM International Conference on Interactive Tabletops and Surfaces, Nov. 7, 2010, pp. 1-10.
Wigdor, et al., "WeSpace: The Design Development and Deployment of a Walk-up and Share Multi-Surface Visual Collaboration System", In Proceedings of the SIGCHI Conference on Human Factors in Computing Systems, Apr. 8, 2009, pp. 1237-1246.
Wilson, et al., "Combining Multiple Depth Cameras and Projectors for Interactions on, above and between Surfaces", In Proceedings of the 23nd annual ACM symposium on User interface software and technology, Oct. 3, 2010, pp. 273-282.
Wimmer, et al., "Curve: Revisiting the Digital Desk", In Proceedings of the 6th Nordic Conference on Human-Computer Interaction: Extending Boundaries, Oct. 16, 2010, pp. 561-570.
Woźniak, et al., "Thaddeus: A Dual Device Interaction Space for Exploring Information", In Proceedings of the 8th Nordic Conference on Human-Computer Interaction: Fun, Fast, Foundational, Oct. 26, 2014, pp. 41-50.
Yang, et al., "Panelrama: Enabling Easy Specification of Cross-Device Web Applications", In Proceedings of the SIGCHI Conference on Human Factors in Computing Systems, Apr. 26, 2014, pp. 2783-2792.
Alexander, et al., Tilt displays: designing display surfaces with multi-axis tilting and actuation, In Proceedings of the 14th international conference on Human-computer interaction with mobile devices and services, Sep. 21, 2012, pp. 161-170.
Ballendat, et al., "Proxemic Interaction: Designing fora Proximity and Orientation-Aware Environment", In Proceedings of the ACM International Conference on Interactive Tabletops and Surfaces, Nov. 7, 2010, 10 Pages.
Barnaby, et al., "Mantis: A Scalable, Lightweight and Accessible Architecture to Build Multiform Force Feedback Systems", In Proceedings of the 32nd Annual ACM Symposium on User Interface Software and Technology, Oct. 17, 2019, pp. 937-948.
Belluci, et al., "Light on Horizontal Interactive Surfaces: Input Space for Tabletop Computing", In Journal of ACM Computing Surveys (CSUR), vol. 46, No. 3, Jan. 2014, 42 Pages.
Buxton, William A. S., "Telepresence: Integrating Shared Task and Person Spaces", In Proceedings of the Conference on Graphics Interface, May 1992, pp. 1-17.
Chen, et al., "Designing a Multi-slate Reading Environment to Support Active Reading Activities", In Journal of ACM Transactions on Computer-Human Interaction, vol. 19, Issue 3, Oct. 2012, 35 Pages.
Chung, et al., "VisPorter: Facilitating Information Sharing for Collaborative Sensemaking on Multiple Displays", In Journal of Personal and Ubiquitous Computing, vol. 18, Issue 5, Jun. 2014, 18 Pages.
Fitzmaurice, George W., "Situated Information Spaces and Spatially Aware Palmtop Computers", In Journal of Communications of the ACM, vol. 36, Issue 7, Jul. 1993, pp. 39-49.
Girouard, et al., "Displaystacks: Interaction Techniques for Stacks of Flexible Thin-Film Displays", In Proceedings of the SIGCHI Conference on Human Factors in Computing Systems, May 5, 2012, pp. 2431-2440.
Seyed, et al., "SkyHunter: A Multi-Surface Environment for Supporting Oil and Gas Exploration", In Proceedings of the ACM International Conference on Interactive Tabletops and Surfaces, Oct. 6, 2013, pp. 15-22.
Hinckley, Ken., "Synchronous Gestures for Multiple Persons and Computers", In Proceedings of the 16th Annual ACM Symposium on User Interface Software and Technology, Nov. 2, 2003, 10 Pages.
Jin, et al., "Corona: Positioning Adjacent Device with Asymmetric Bluetooth Low Energy RSSI Distributions", In Proceedings of the 28th Annual ACM Symposium on User Interface Software & Technology, Nov. 8, 2015, pp. 175-179.
Kendon, Adam., "Conducting Interaction: Patterns of Behavior in Focused Encounters", In Publication of Cambridge University Press, Nov. 30, 1990.
Khalilbeigi, et al., "FoldMe: Interacting with Double-sided Foldable Displays", In the Proceedings of 6th International Conference on Tangible, Embedded and embodied Interaction, Feb. 19, 2012, pp. 33-40.
Krogh, et al., "Sensitizing Concepts for Socio-Spatial Literacy in HCI", In Proceedings of the 2017 CHI Conference on Human Factors in Computing Systems, May 6, 2017, pp. 6449-6460.
Langer, et al., "VisTiles: Coordinating and Combining Co-Located Mobile Devices for Visual Data Exploration", In Journal of IEEE Transactions on Visualization and Computer Graphics, vol. 24, Issue 1, Jan. 2018, pp. 626-636.
Ledo, et al., "Astral: Prototyping Mobile and Smart Object Interactive Behaviours Using Familiar Applications", In Proceedings of the 2019 on Designing Interactive Systems Conference, Jun. 23, 2019, pp. 711-724.
Lee, et al., "Tilting Table: A Movable Screen", In Proceedings of the 1st International Conference on Tangible and Embedded Interaction, Feb. 15, 2007, pp. 93-96.
Luff, et al., "Mobility in Collaboration", In Proceedings of the ACM Conference on Computer Supported Cooperative Work, Nov. 14, 1998, pp. 305-314.
Santosa, et al., "A Field Study of Multi-Device Workflows in Distributed Workspaces", In Proceedings of the ACM International Joint Conference on Pervasive and Ubiquitous Computing, Sep. 8, 2013, pp. 63-72.
Wozniak, et al., "RAMPARTS: Supporting Sensemaking with Spatially-Aware Mobile Interactions", In Proceedings of the CHI Conference on Human Factors in Computing Systems, May 7, 2016, pp. 2447-2460.
Li, et al., "SMAC: A Simplified Model of Attention and Capture in Multi-Device Desk-Centric Environments", In Proceedings of the ACM on Human-Computer Interaction, vol. 3, Jun. 13, 2019, 47 Pages.
"Invention to Pay Additional Fees Issued in PCT Application No. PCT/US22/029933", Mailed Date: Sep. 12, 2022, 14 Pages.
"International Search Report and Written Opinion Issued in PCT Application No. PCT/US22/029933", dated Nov. 4, 2022, 19 Pages.

\* cited by examiner

INSTANCE ONE

INSTANCE TWO

INSTANCE THREE

INSTANCE FOUR

MULTIPLE DEVICE CONTENT MANAGEMENT

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DETAILED DESCRIPTION

This patent relates to a unique semi-fixed style of cross-device interaction via multiple self-spatially-aware armatures to which users can easily attach (or detach) tablets and other devices. For ease of discussion these aspects may be referred to as 'AirConstellations.' In particular, AirConstellations can afford highly flexible and dynamic device formations where users can bring multiple devices together. The devices can be supported by location-aware armatures that allow the devices to be poseable in 7DoF (seven degrees of freedom) within the same workspace. This can allow the user to create a 3D (three dimensional) configuration that satisfies the users' current task, social situation, app scenario, and/or mobility needs. This affords an interaction metaphor where relative orientation, proximity, attaching (or detaching) devices, and continuous movement into and out of ad-hoc ensembles can drive context-sensitive interactions. Yet all devices remain self-stable in useful configurations even when released in mid-air.

AirConstellations can offer a flexible physical arrangement, feedforward of transition options, and layering of devices in-air across a variety of multi-device app scenarios. These multi-device app scenarios can include videoconferencing with flexible arrangement of the person-space of multiple remote participants around a shared task-space, layered and tiled device formations with overview plus detail and shared-to-personal transitions, and flexible composition of UI panels and tool palettes across devices for productivity applications.

Devices can be controlled in a flexible manner based at least in part upon their locations and poses within a constellation in 3D space (e.g., in the context of all of the devices of the constellation). This flexibility can allow device control to range from nested to hierarchical depending on the sensor data. For example, a device federation might start with three devices that are simply running their own separate apps, then two might be brought together, such as to have a map application span the two, and then the third could be brought in to either expand the map across a third screen, or offer complementary uses, such as to display directions between destinations the user selects on the associated pair of devices.

Figure 1A:
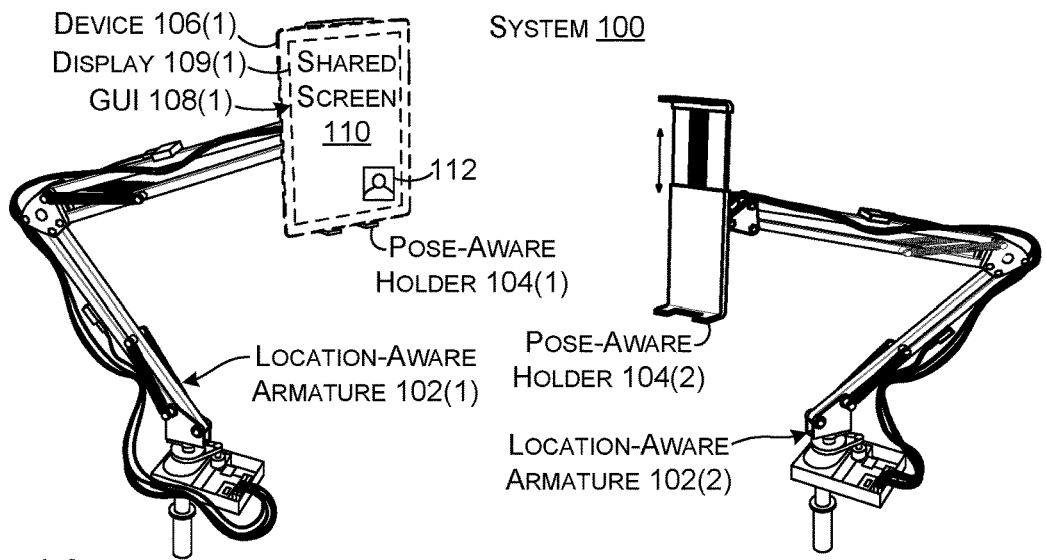
FIGS. 1A-1C, 2, 3A-3B, 5, 6A-6B, 7A-7B, 9, 10, 12-15, and 17 show perspective views of example collectively managed devices in accordance with some implementations of the present location and pose-aware concepts.
Figure 1B:
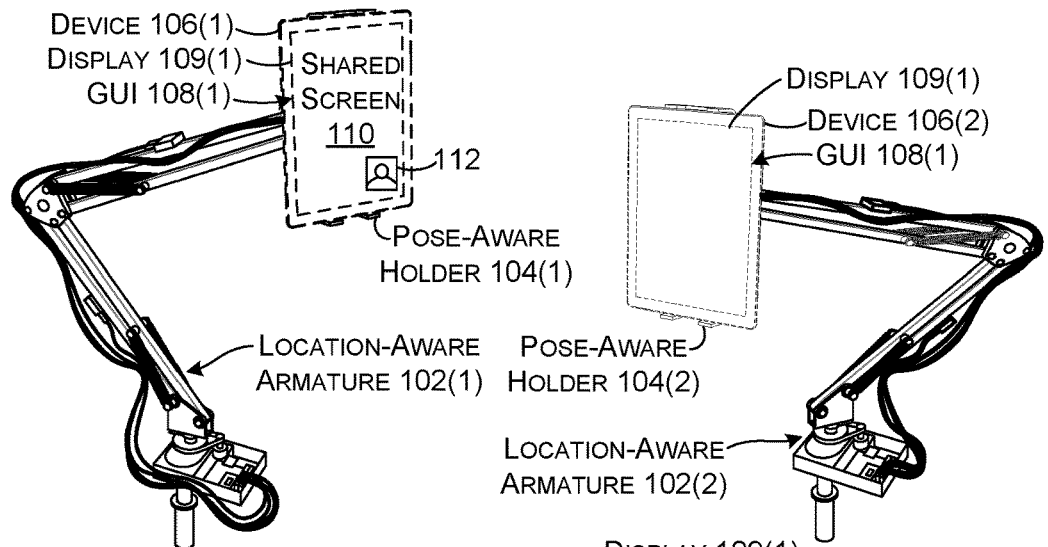
Figure 1C:
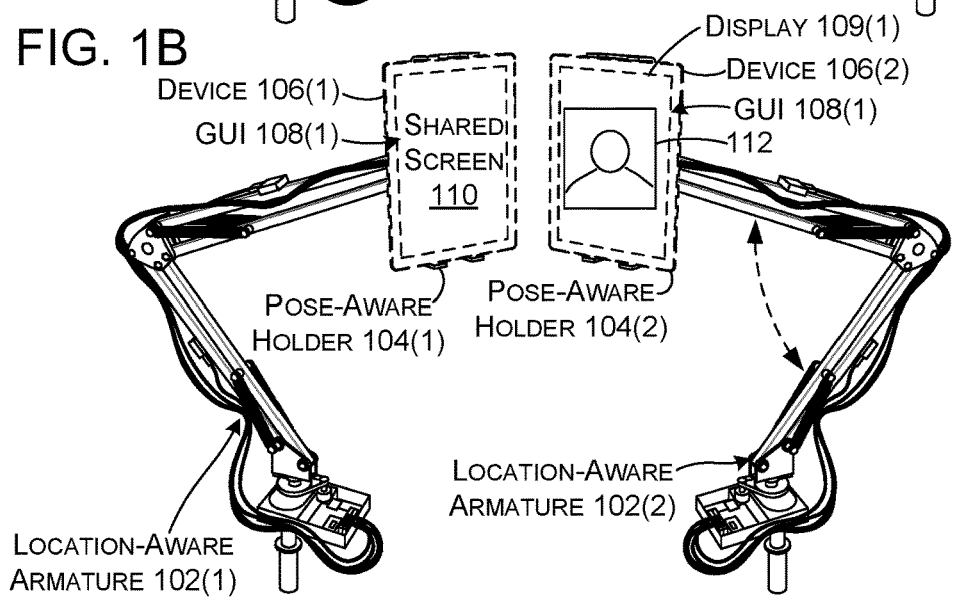

FIGS. 1A-1C collectively show an example system 100 and associated use case scenarios. In the illustrated configuration, system 100 includes two location-aware armatures (LAA) 102. Individual location-aware armatures can include pose-aware holders (PAH) 104. The pose-aware holders can hold various types of computing devices (devices) 106. The devices 106 are shown in 'ghost' in FIGS. 1A-1C to indicate that the devices are not part of the location-aware armatures 102. The location-aware armatures 102 can sense a 3D position or location of the associated pose-aware holders 104. The pose-aware holders 104 can sense a pose, posture or orientation of the device 106. Collectively, the location-aware armatures 102 with their pose-aware holders 104 can physically hold the device 106 where the user positions it and can sense the 3D location and pose of the device (e.g., in a self-spatially-aware manner).

FIG. 1A shows an initial scenario where first device 106(1) is held by pose-aware holder 104(1) at a location and pose set by the user. Content in the form of a GUI (graphical user interface) 108 is being presented on a display 109 of the device 106(1). For purposes of explanation, assume the content relates to a video conferencing scenario. A remote user is sharing his/her screen at 110 and the remote user is visualized at 112. At this point, pose-aware holder 104(2) is empty.

FIG. 1B shows a subsequent point where the user has positioned a second device 106(2) in pose-aware holder 104(2).

FIG. 1C shows a further point where the user has positioned the second device 106(2) at a 3D location and pose that is 'cooperative' with the first device. In this case, the locations are adjacent and the poses are generally coplanar. Accordingly, content from the first device 106(1) can be allocated across both devices. In this example, the display area of the first device 106(1) is now allocated to the shared screen 110 and the display area of the second device 106(2) is allocated to visualizing the remote user 112. This allocation can be done automatically based upon the 3D location and pose of the devices. Alternatively, the system can allow the user to easily indicate how they want to allocate the content (or different content) on the devices.

Note that for ease of illustration FIGS. 1A-1C show two devices held by two location-aware armatures and only one device is moved in the illustrated sequence. However, one point of the description is to convey that there can be multiple devices on multiple location-aware armatures and the user can easily move any or all of them into any 3D orientation they want and then move them again as their needs/desires change. The system can track the device movements and update content presentation across the devices accordingly. Examples with three and four devices are shown below relative to FIGS. 5-17 and other implementations can include more than four devices.

Figure 2:
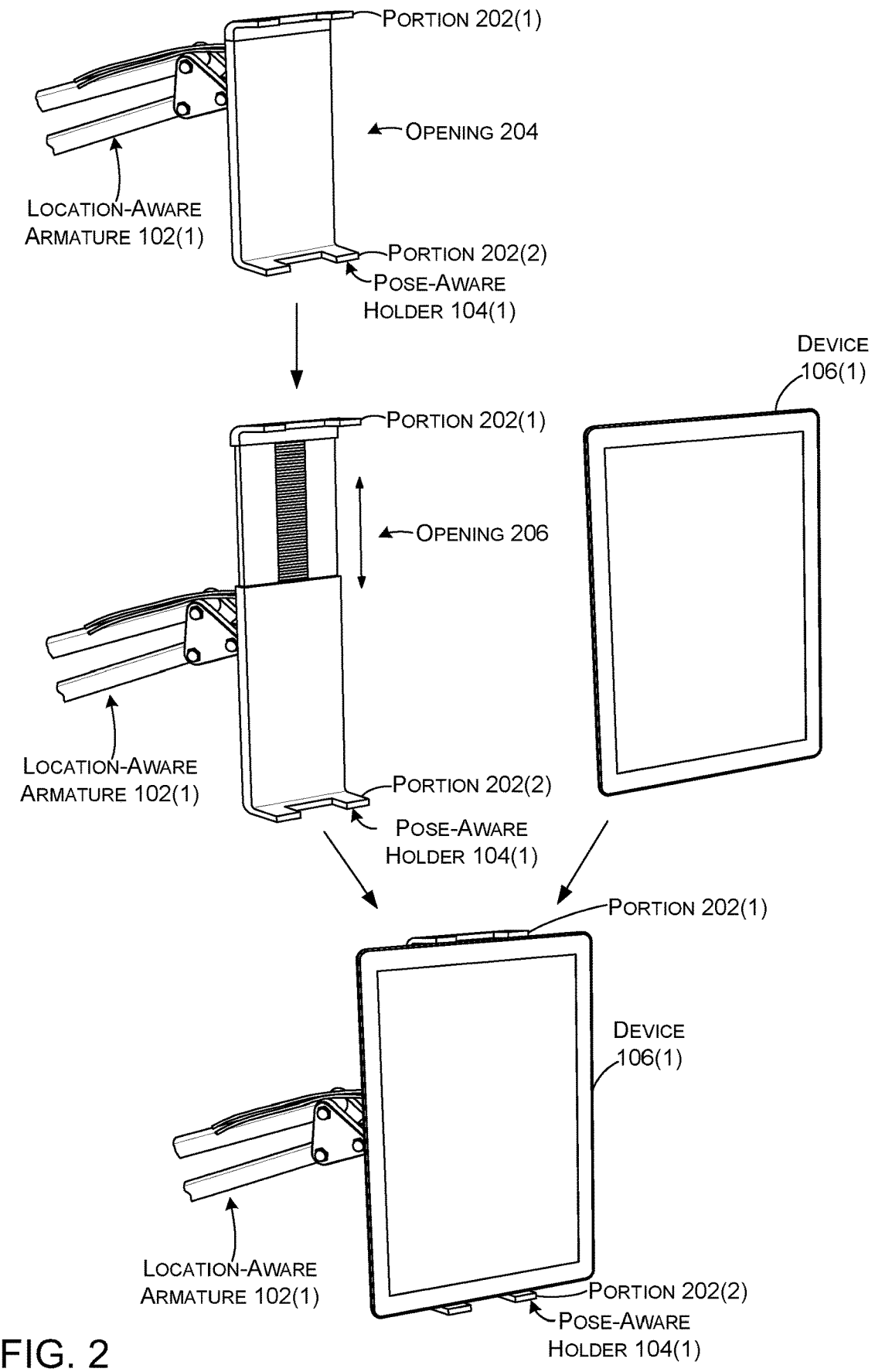
Figure 3A:
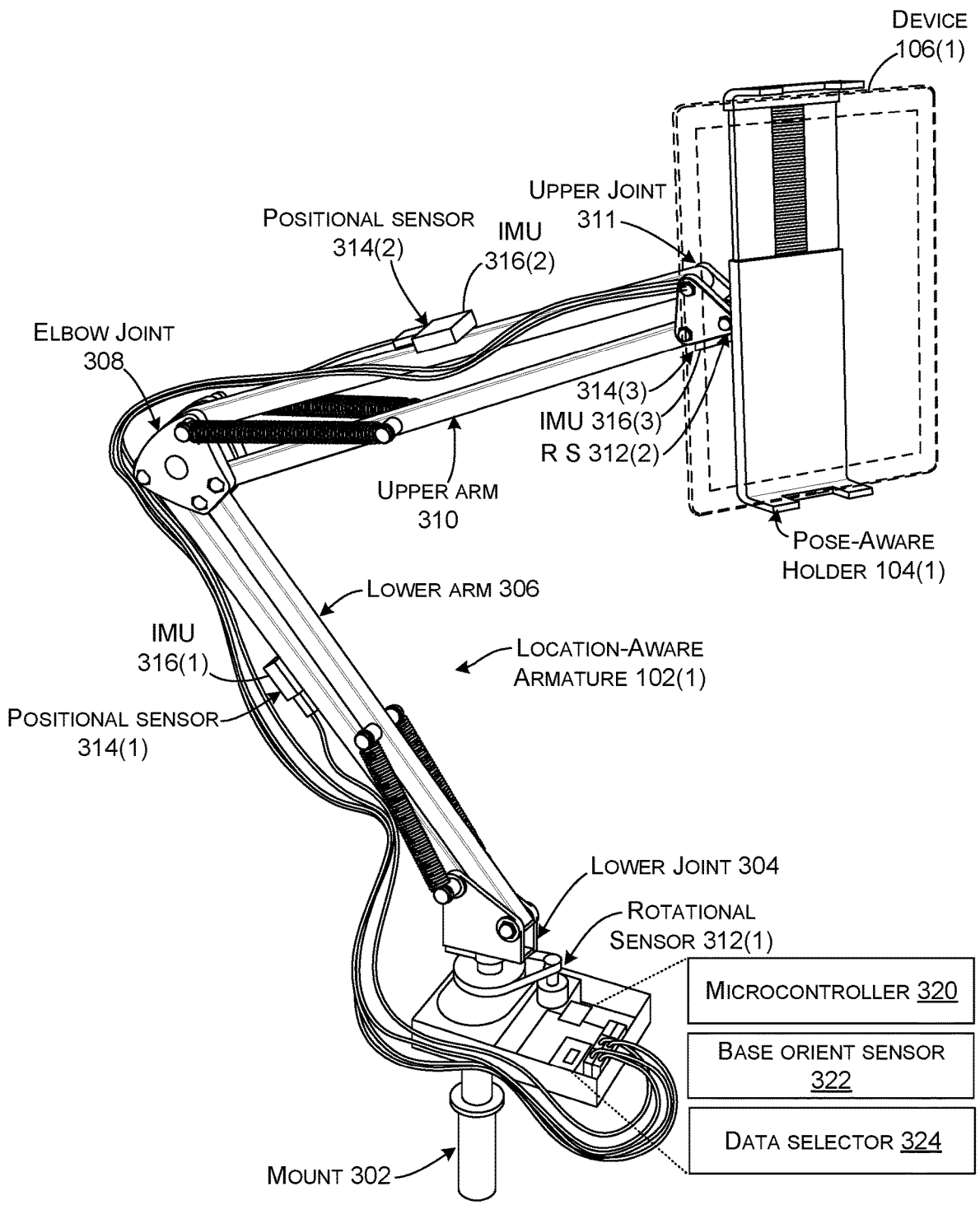
Figure 3B:
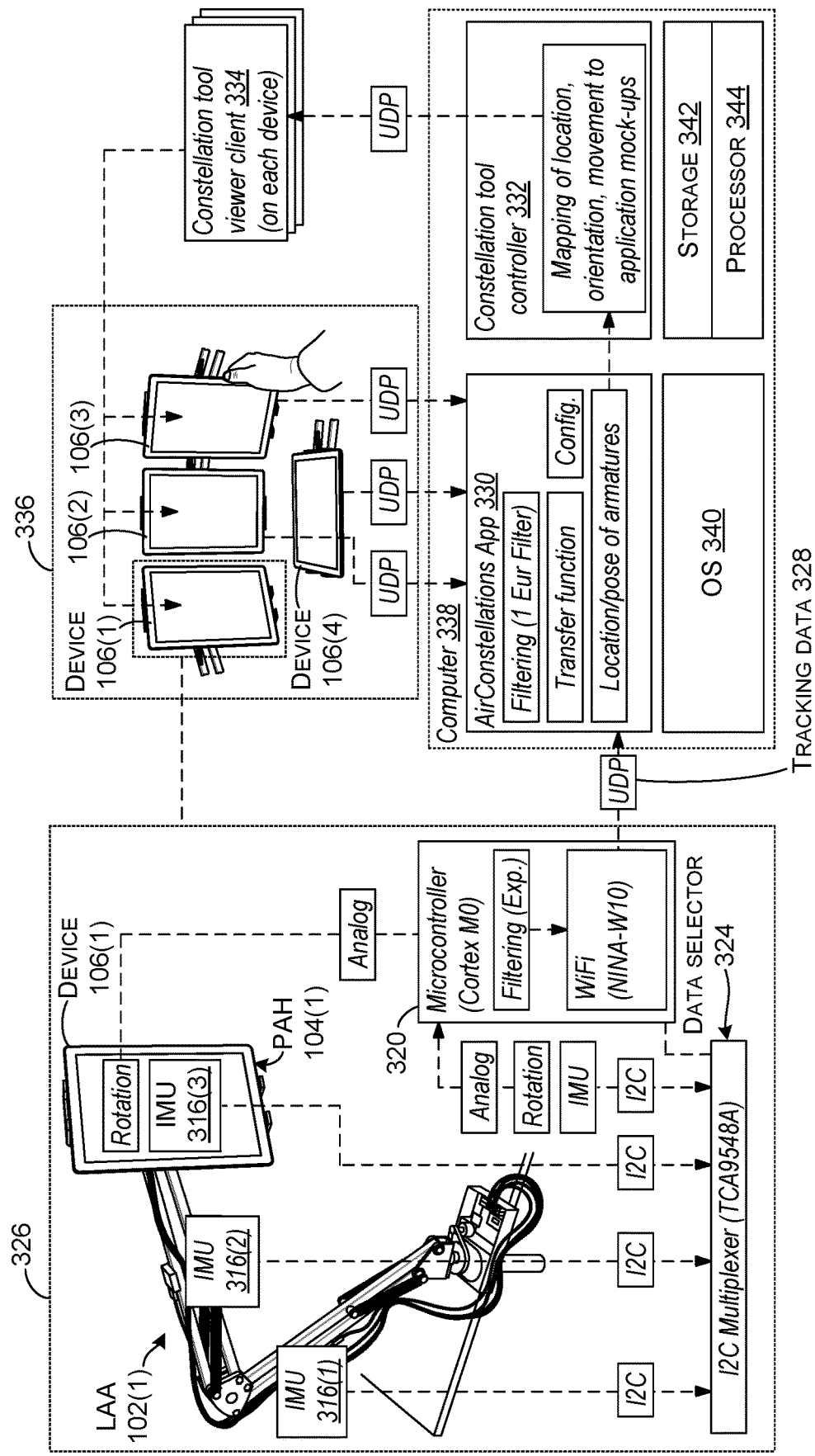

FIGS. 2 and 3A-3B offer additional details relating to the example location-aware armature 102(1). FIG. 3B shows details relating to how 3D location and pose information from the location-aware armature 102(1) (or other source), can be used to control multiple distinct devices.

FIG. 2 shows details of example pose-aware holder 104 (1) and how the pose-aware holder 104(1) can physically hold devices. In this case, the pose-aware holder includes two portions 202(1) and 202(2) that are slidable relative to one another. A biasing member (not visible) can bias the first and second portions toward one another (along the slide) to reduce an opening size 204. The user can overcome the bias to increase the opening size as indicated at 206 and insert device 106(1) (or other devices having different dimensions). The user can then let the biasing member slide the portions 202 toward one another against the device with sufficient force (e.g., bias) to retain the device between the portions 202. Other types of mechanisms for holding devices are contemplated.

FIGS. 3A and 3B collectively show details of an example location-aware armature 102(1) and how device location and pose data can be utilized to control a constellation or federation of distinct devices. FIG. 3A shows details of example location-aware armature 102(1) and how the location-aware armature 102(1) can sense 3D location and pose data. FIG. 3B shows a system architecture that can utilize device location and pose data to control a group of distinct devices as a dynamic constellation or federation of devices.

FIG. 3A shows that in this example, the location-aware armature 102(1) includes a base or mount 302. Various types of mounts are contemplated for mounting either temporarily or permanently to various horizontal and/or vertical structures. In the illustrated implementation, the mount includes a post that can be received in a receptacle on a mounting structure, such as a table, desk wall, or even descend from an overhead mounting bar on a ceiling or office (cubicle) partitions, among others. In some such configurations the armature may fold into and be hidden within a wall, desk, or furniture panel when not in use. In other configurations, the mount 302 can be manifest as a clamp, for instance.

A lower joint 304 can connect the mount 302 to a lower arm 306. An elbow joint 308 can connect the lower arm 306 to an upper arm 310. The upper arm 310 can terminate at the pose-aware holder 104 at an upper joint 311. The lower arm 306 and the upper arm 310 can be manifest as four-bar linkages, among other configurations. A first rotational sensor 312(1) can sense rotation at the lower joint 304. A first positional sensor 314(1) can sense the lower arm 306, a second positional sensor 314(2) can sense the upper arm 310, and a third positional sensor 314(3) can sense the position of the pose-aware holder 104(1). A second rotational sensor 312(2) can sense the rotation of the pose-aware holder 104(1). In this illustrated implementation, the first positional sensor 314(1) is manifest as an inertial measurement unit (IMU) 316(1) positioned on the lower arm 306, the second positional sensor 314(2) is manifest as an IMU 316(2) positioned on the upper arm 310, and the rotational sensor 314(3) is manifest as an IMU 316(3). Other sensor types are contemplated.

Various electronics can be positioned in the base or mount 302 to gather and transmit sensor data, among other functions. In this case, the electronics can include a microcontroller 320, a base orientation sensor 322, such as a motion processing unit (MPU-9250), and a data selector 324.

One implementation can employ an Arduino MKR 1010 Wi-Fi (Cortex M0) as the microcontroller 320, which can also provide wireless communication functionality. This implementation can also employ a 1-to-8 I2C multiplexer (TCA9548A) as the data selector 324. These components can be coupled to the rotational sensors 312 as well as the positional sensor 314. These sensors, such as MPU6050 or MPU9250 can include three-axis accelerometers and three-axis gyroscopes to provide six DoF (degrees of freedom). In this case, one IMU can be employed for the lower joint 304 and one for the elbow joint 308, one for the base, and one at the pose-aware holder 104(1). To eliminate yaw-axis drift (common with any IMU-based sensing), yaw-axis measurements are not utilized from the IMUs but instead from the added mechanical rotation sensors 312.

The rotation sensors 312 can use high-precision 10-turn rotation sensors (for example, Bourns 3510) with a connected 1:5 gear translation at the lower joint 304 and/or the upper joint 311. One example algorithm can then combine the yaw-axis rotation measures (from the mount and holder rotation axis) with the pitch-axis measures provided by the IMUs for determining the 3DoF position of the device in space, together with the 3DoF orientation of the device around the pose-aware holder 104(1) of the location-aware armature 102(1).

The description above relating to FIG. 3A explains example hardware that can allow a user to position multiple independent devices at desired 3D locations and poses. The hardware can maintain the devices at the 3D locations and poses (e.g., in air). The hardware (and/or different hardware) can sense or track these locations and poses. The tracked locations and poses can be utilized to control content on the devices as discussed relative to FIGS. 1A-1C and as will be discussed below relative to FIGS. 4A-17. The discussion below relating to FIG. 3B provides context of how tracked device locations and poses can be utilized to control the content on the various devices.

FIG. 3B shows an example platform or system 100A that can include devices 106 held by location-aware armatures 102. This section explains a technical platform implementation that can enable dynamic in-air device formations for cross-device computing. Hardware (e.g., location-aware armatures 102(1)) relating to tracking and physically holding an individual device 106(1) is indicated generally at 326 and is described above relative to FIGS. 1A-2 as well as in the present discussion relative to FIGS. 3A and 3B. The tracking data can be shared using various protocols, such as UDP (user datagram protocol) in the illustrated implementation as indicated generally at 328. While one set of hardware and an associated 'held' device is shown, multiple sets of hardware and devices can be included. Thus, the hardware shown at 326 (or other hardware) can be duplicated for multiple devices to enable multiple devices to contribute to dynamic in-air device formations. Note also that in the illustrated configuration of FIG. 3A, the location-aware armature 102(1) includes a dedicated mount 302. However, in other implementation, the mount 302 could support multiple location-aware armatures 102 (e.g., a shared base or mount).

The tracking data 328 can be utilized by Air Constellations software 330. The AirConstellations software can filter the input from each location-aware armature 102 according to a user-defined configuration. The AirConstellations software or application (app) 330 can work cooperatively with a constellation tool controller 332. The constellation tool controller 332 can map the sensor data to an application rendering. The mapped sensor data can be provided to a constellation tool viewer client 334 that can reside on (or operate relative to) each device 106. The constellation tool viewer client 334 can control the content output on each device 106(1)-106(4) making up the constellation or federation 336. Note that the AirConstellations app 330 and the constellation tool controller 332 can reside on a computer 338. The computer 338 can be one of the devices 106 and/or a different computer, such as a different local computer or remote computer, such as a cloud computer. Thus, in some configurations, all of the AirConstellations software occurs on the devices 106 presently involved in a constellation. In other configurations, some of the software may reside on other devices (e.g., supervisor or server devices) with the devices 106 in the constellation acting in a worker or client role.

Looking again at the overall system configuration, multiple location-aware armatures 102 or other self-tracking hardware can releasably hold the user's devices at physical locations and poses selected by the user. Multiple location-aware armatures 102 can hold and track multiple devices. The tracking data can allow the user to organize multiple devices in any 3D relationship the user wants. The system 100A allows for fluid reconfigurability in small-scale, multi-device setups so that multiple displays and other devices can be freely positioned in the same working volume.

The location-aware armatures 102 can be attached to any surface, such as a desk or a table. On first use, the position of the location where each of the armatures is attached can be configured in the AirConstellations app 330 (i.e., the relative location and distance from one mount to the next). After this one-time configuration, the location-aware armatures 102 can continuously track the location and pose of the attached device 106 when moved, and send this information to computer 338 merging all the position information and running the constellation tool controller 332, which can be in communication with the AirConstellations application 330.

The AirConstellations application 330 can utilize multiple levels of software filtering to stabilize the sensor signals in the tracked data 328 and reduce/minimize jitter and/or any mechanical wobble associated with the armature when using the sensed location and pose of the devices 106 to drive application responses. The microcontroller 320 can do 12-bit sampling of the analog rotation sensors, oversampling at 110 Hz, and use an exponential filter as a first level filtering for the measured orientation angles—from the two rotation sensors and the four IMUs. The mount/base then connects to the computer 338 over Wi-Fi, such as using the micro controller's NINA-W10 radio of the u-blox chip, and can stream all sensor values at 60 Hz via UDP to a C # software tool. The AirConstellations application 330 can use an additional filter level over all sensor values using the 1 € filter (One Euro Filter) ($\beta$=0.007, dcutoff=1.1, fcmin=0.02), for example. The Euro Filter can be used to implement a wide range of transfer functions. Alternatively, a tilt transfer function can be employed to provide stability, high precision control, and yet also respect absolute positioning of the devices after any larger-scale motions.

The AirConstellations application 330 can supply the filtered sensor data to the constellation tool controller 332. The constellation tool controller 332 can map locations and poses of the various devices from the data supplied by the AirConstellations application 330. The cutoff constellation tool controller 332 can provide the mapping information of the various devices 106 to the constellation tool viewer client 334. Note that in some implementations, there may be multiple constellation tool controllers 332 (e.g., location-aware armatures (e.g., AirConstellations armatures) installed on adjacent desks in a shared office space) that can coordinate their actions and device federations if brought into close association.

A constellation tool viewer client 334 instance can occur on (or relative to) each device 106 to allow fluid interactive behaviors with the dynamic in-air device formations. The constellation tool viewer client 334 can allow quick implementation of dynamic application behaviors. This feature can allow user customization of device interactions to suit their preferences. Multiple example dynamic application behavior scenarios are described below relative to FIGS. 5-17.

From one perspective, the constellation tool viewer client 334 can create a scaffolding that allows interaction-driven animations by (1) connecting multiple devices together, (2) processing the sensor data, and (3) enabling translation of the sensor data into rich continuous animations as the interactions are taking place.

The constellation tool viewer client 334 can display the different animated application sequences on the devices 106 attached to location-aware armatures 102. Each of the constellation tool viewer clients 334 can receive the real-time sensing data (as part of a UDP stream) of the AirConstellations platform. The constellation tool viewer client 334 can then dynamically animate the application interface in response to the physical movement of the devices and physical changes of the formations.

Computer 338 (and/or devices 106) may also include an operating system 340, storage/memory 342, and/or a processor 344. Alternatively, the computer may employ a system on a chip (SOC) type design.

In SOC configurations, functionality provided by the device can be integrated on a single SOC or multiple coupled SOCs. The term "processor" as used herein can also refer to central processing units (CPUs), graphical processing units (GPUs), field programmable gate arrays (FPGAs), controllers, microcontrollers, processor cores, and/or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media that are configured to store data and/or computer-readable instructions. The features and techniques of the component are platform-independent, meaning that they may be implemented on a variety of commercial computing platforms having a variety of processing configurations.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

Examples of devices 106 can include traditional computing devices, such as personal computers, notebook computers, cell phones, smart phones, personal digital assistants, pad type computers, mobile computers, displays, keyboards, input devices, output devices, smart devices etc. and/or any of a myriad of ever-evolving or yet to be developed types of computing devices.

System 100A provides solutions as people increasingly own and use multiple devices in their personal workspaces. This is a long-term trend accelerated by remote work during the COVID-19 pandemic. In the course of a single day, the user may go from a teleconference to data analysis to editing spreadsheets and back again—with unpredictable intrusions of home life (e.g., partners, children, deliveries) driving task shifts or spur-of-the-moment reconfigurations. Within these personal device ecologies, cross-device computing leverages the complementary roles and micro-mobility afforded by individual devices to support a wide range of application scenarios, use cases, and communication.

In these emerging cross-device ecologies, most existing work either uses fixed setups with combinations of interactive surfaces embedded in the environment for individual and small-group use, or mobile cross-device setups that link devices such as tablets, phones, or other digital surfaces into ad-hoc, lightweight federations. Physical reconfigurations to better adapt to changes in tasks, users, or other context remains difficult in fixed spaces—and while easier in mobile setups, there are often only limited options to spatially arrange devices around a workspace, so they often remain either hand-held or placed flat on a desk surface. Furthermore, for most mobile setups, sensing where devices are in space (which drives many cross-device interaction techniques) remains challenging.

In between those two classes of fixed vs. mobile multi-device use, the present concepts offer a third category of semi-fixed cross-device setups. The present concepts provide a technical solution of preserving the modularity and rapid re-configurability of mobile setups, while at the same time allowing physical rearrangement of diverse configurations as the task and situation demand, facilitating people's rich practices of spatially organizing information. There have been several investigations into more flexible device configurations, such as through actuated furniture or re-connectable devices. Yet, preserving high degrees of modular reconfigurability, affording fluid and lightweight changes of physical workspace device configurations, remains a challenge. This becomes even more difficult for interactions on a desktop-scale, with fast-changing working practices and potentially smaller workspaces availability or frequent necessary changes due to use for multiple purposes.

AirConstellations contributes a new technical approach, platform, and techniques for in-air, poseable multi-device assemblages—devices not only flat on a table, but floating in front, at varying angles, and/or huddled together. AirConstellations workspaces can be composed of multiple location-aware armatures with attached devices (such as tablets), allowing easy physical movement and positioning of devices around a workspace. The location-aware armatures can track location and pose of the device via a 7DoF model of device assemblages around the workspace. This sensor augmentation opens up new possibilities for sensor-driven application behaviors. To inform the design of this new category of mid-air, spatially-aware cross-device setups, a design space can be synthesized—along 14 dimensions of hardware configuration (arrangement, orientation, structure, layering, scale, fixture, form, modality, and dynamic) and interaction (users, reach, approach, spatial sensing, sensor mapping, and behavior), for example. This aspect is described in more detail below relative to FIGS. 4A and 4B.

The present AirConstellations concepts contribute a set of applications and interaction behaviors, illustrating techniques across different segments of this device formation design space. In particular, the sensed information of 3D position and orientation of connected devices can be used to drive applications responding (with a low transaction cost) to any changes of orientation or proximity between devices. Example applications include a video conferencing app facilitating fluid separation of task and person-space, the use of layered and tiled device formations with techniques such as overview plus detail and shared-to-personal transitions, and flexible workspaces and tool palettes in productivity applications. Ad-hoc operations can be used for managing graphical windows and files across devices, and explore feedforward and feedback to continuously reveal interaction possibilities, so that the user can discover, select between different options (including automatically generated suggestions for application spanning and partitioning behaviors), and act on (or choose to ignore) AirConstellations' spatially-aware behaviors.

The AirConstellations system 100A can offer technical solutions in the form of semi-fixed cross-device interaction with dynamic in-air device formations via multiple self-stable, location-aware armatures 102. The described design space articulates multiple key dimensions of spatial configuration and interaction for semi-fixed cross-device setups. Application scenarios & interaction techniques for the dynamic device formations afforded by AirConstellations, can include layering, tiling, adjacency, and feedforward animations that surface capabilities to the user. Multiple AirConstellations devices used together in the same operating volume can afford some aspects from mobile interaction while simultaneously offering some properties of semi-fixed device arrangements in a way that is flexible and delightful, allowing the effort of forming a particular device arrangement to repay itself over time because it stays put in mid-air once released. Such devices, in combination with appropriate applications, feedback, and interaction techniques, open up an intriguing new design space of highly dynamic and easily reconfigurable personal workspaces with dynamic in-air device formations.

Tracking data from location-aware armatures 102 can drive a number of novel interaction techniques. Several such interaction techniques are described relative to AirConstellations' use case scenarios as illustrated and described below starting with FIG. 4A.

Airconstellations system 100A facilitates cross-device computing, in particular for fixed, instrumented environments and mobiles, ad-hoc collaborative interactions, challenges of spatial tracking, and work towards reconfigurable workspaces.

Large interactive surfaces can form parts of effective individual or collaborative workspaces. Varying physical form factors and orientation can afford collaborative work: from horizontal, tilted, to vertical surfaces. Non-planar, bent interaction surfaces can facilitate reach and visibility of digital information.

To better support collaborative work, multiple interactive surfaces can be combined in interactive environments, such as for collaborative astrophysics explorations (i.e., of extremely large images), facilitating video mediated communication, and/or data analytics, among others. Most combine horizontal and vertical displays, some use projectors, or other forms of output (cf. taxonomies). These interactive environments could be categorized as fixed features, parts of a space that are not or only rarely reconfigured or changed. To make interactive spaces adapt to changes in context, some follow a hybrid approach, e.g., by including mobile devices and laptops in a "walk up and share environment."

For most cross-device setups, one particular challenge is to infer information about where devices are—their position/location and orientation/pose—to enable any spatially aware cross-device interaction techniques (e.g., easily re-directing input to devices, directional gestures transferring content). This is why a majority of traditional cross-device research investigates strategies to sense inter-device proximity and orientation. Some use computer vision of RGB, depth cameras, marker-based motion capture, polarization filters, or eye tracking. Other traditional techniques apply short-range infrared sensing, radio-based sensing such as Bluetooth, or near-field communication (NFC, RFID). Hybrid approaches are promising, for example fusing radio- and camera-based sensing, or Bluetooth-radio and acoustic stereo signal positioning. Aside from automated tracking, synchronous gestures and stitching, these traditional techniques can be effective for quickly forming device federations. Reliable and robust sensing, however, remains a "major challenge" in that vision-based sensing achieves relatively high spatial resolution but faces difficulties with occlusion, lighting conditions, and potentially undesirable always-on camera tracking; and radio-based sensing struggles with achieving high spatial resolution or accuracy. Furthermore, many of these traditional setups require outside-in-tracking, which can limit their use and deployability.

Reconfiguration of a workspace or device setup can be beneficial for various cases: better supporting a particular social interaction, adapting small workspaces or spaces with multiple uses, or changing a setup for a different activity. One approach for such reconfigurability is the integration of actuated, shape-changing mechanisms—e.g., surfaces changing from horizontal to vertical, drafting-table orientation, or shape changes of the surface area depending on tasks. On a smaller scale, HoverPad uses an actuated screen above a tabletop, and Living Desktop introduced mechanically actuated monitors and keyboards that reconfigure depending on task or social context.

In some cases, the boundaries between technology and interior architecture blur, when devices or displays become furniture-like modular blocks. For instance, AdapTable uses smaller tabletop-blocks, UbiWall allows modular display cubes to be reassembled when needed, and Foxels integrates various input and output capabilities in furniture cubes. Similarly, i-LAND explored such device-furniture hybrids, for example with ConnecTables where display spaces merge when moving tables in direct proximity. u-Texture introduced grid-like structures and links that allow surfaces to be assembled in different horizontal and vertical arrangements, and SurfaceConstellations uses 3D-printed brackets to form multi-device workspaces. Shape-changing and modular mobile devices allow reconfigurability at the smallest scale.

The AirConstellations' system 100A can leverage information about any changes of the spatial configuration of a device—or devices—to function as input, affecting application behavior. The AirConstellations' system 100A is positioned in the space between fixed and mobile device setups and can offer a new approach and platform for dynamic in-air device formations. AirConstellations' system 100A can leverage this modularity and high degree of reconfigurability. These semi-fixed setups have the potential to effectively support changing working practices—such as the need for increased work at home, with possibly smaller or shared workspaces, or demands for more flexible device and furniture configurations in offices for collaboration.

Figure 4A:
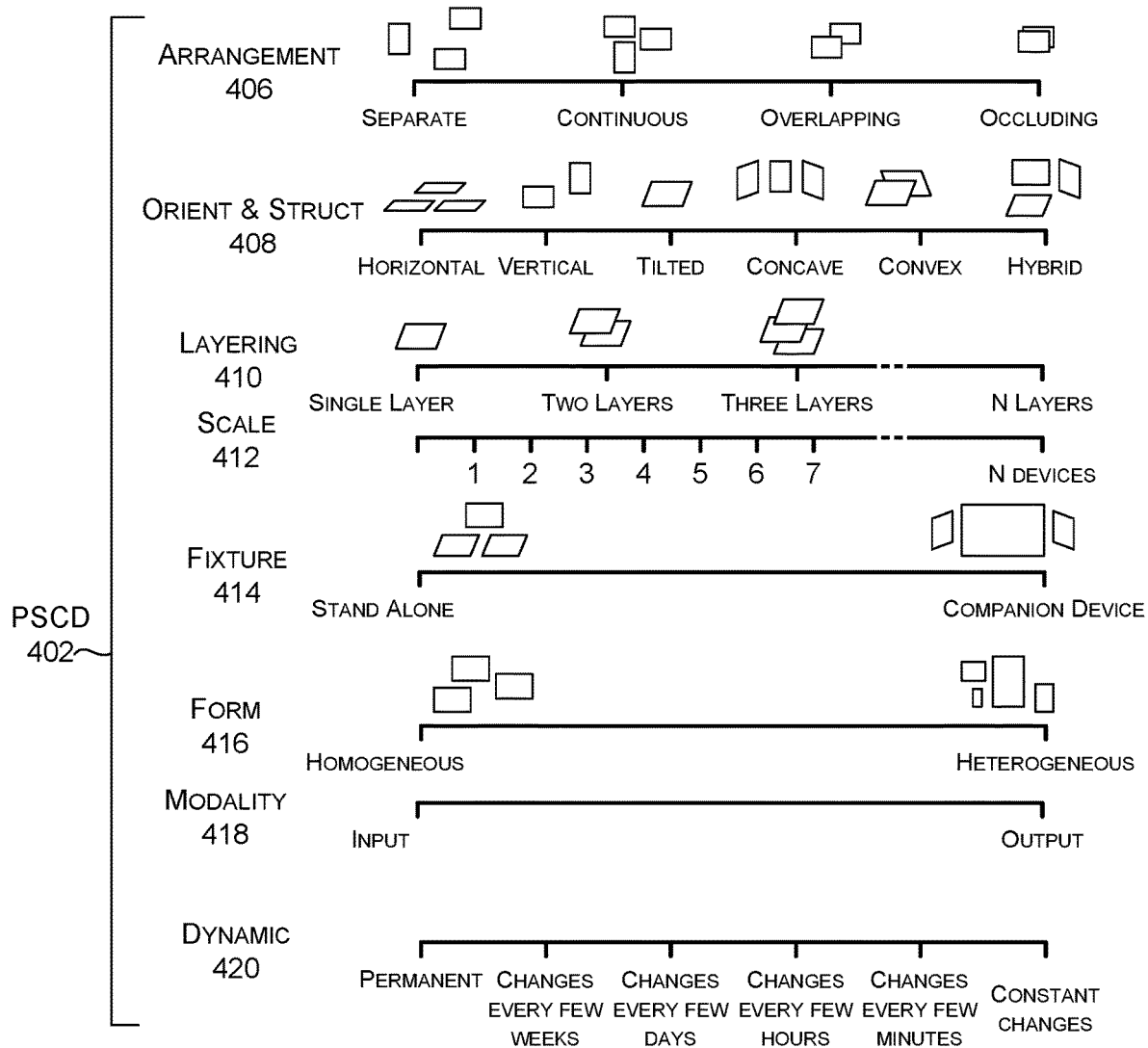
FIGS. 4A and 4B show charts of example dimensions for collectively managing devices in accordance with some implementations of the present location and pose-aware concepts.
Figure 4B:
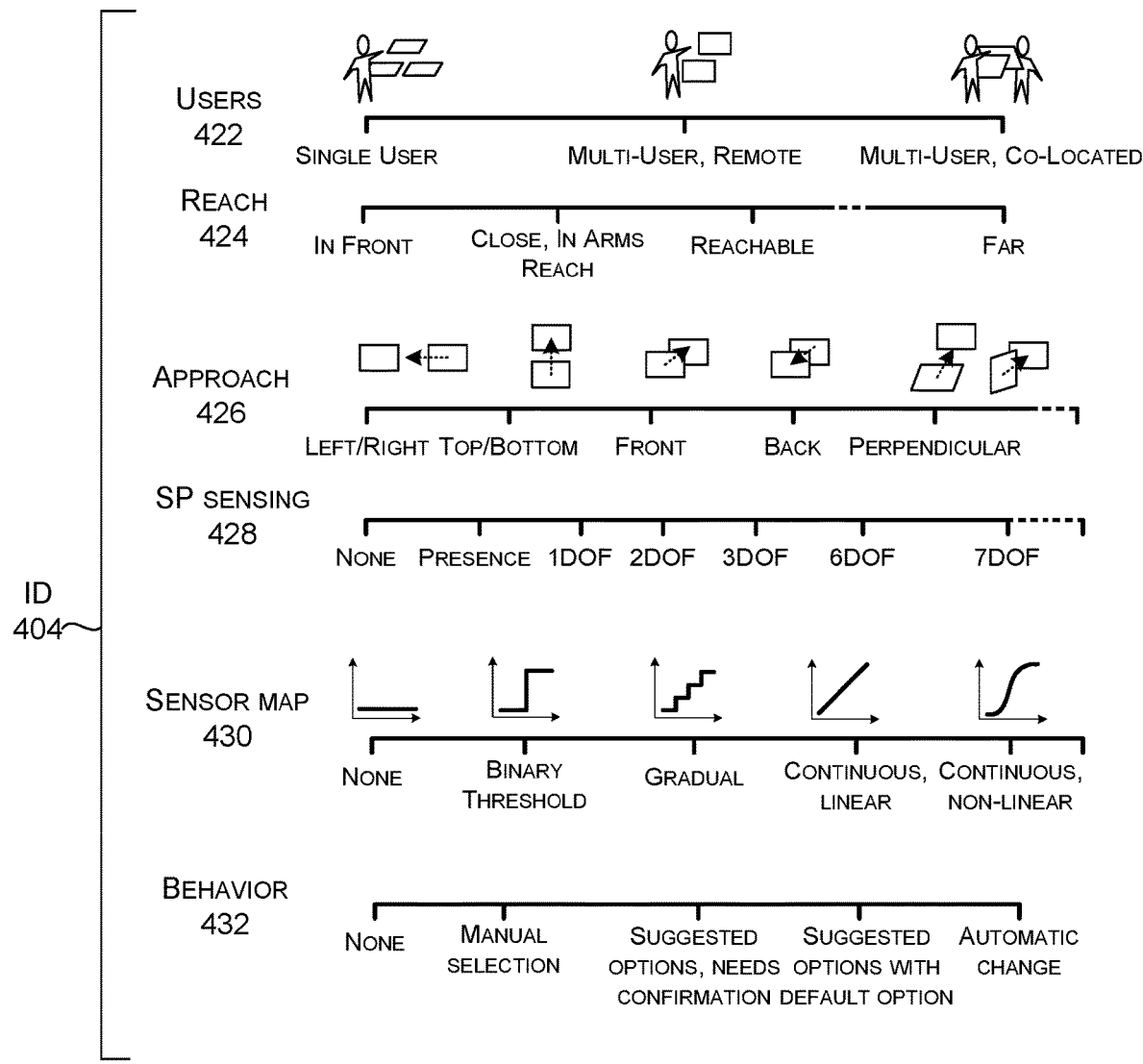

FIGS. 4A and 4B show charts 400 that collectively introduce use case scenarios utilizing dynamic in-air device formations, to synthesize a design space along dimensions that represent varying interaction techniques, sensing fidelity, physical characteristics, and spatial arrangements. These scenarios can incorporate other classifications, in particular the dimensions of flexible dual-device configurations, articulated orientation angles of tilted drawing boards, mappings of the field of cross-device interaction, and modular assemblies of multi-device workspaces—but also disparate but related dimensions of graspable user interfaces. Several potentially key dimensions relevant for the design of spatially-aware dynamic in-air device formations are identified and organized into physical and spatial configuration dimensions (PSCD) 402 shown on FIG. 4A and interaction dimensions (ID) 404 shown on FIG. 4B.

As shown on chart 400A of FIG. 4A, the physical and spatial configuration dimensions 402 can include arrangement 406, orientation and structure 408, layering 410, scale 412, fixture 414, form 416, modality 418, and/or dynamic 420. The interaction dimensions 404 on FIG. 4B can include users 422, reach 424, approach 426, spatial sensing 428, sensor mapping 430, and/or behavior 432, among others.

Arrangement dimension 406 can relate to the spatial configuration of devices. For instance, devices can be separated, continuous surface (e.g., edge to edge), overlapping, and/or occluding, among others.

Orientation & structure dimension 408 can relate to how devices are physically oriented in space. For instance, the devices can be oriented horizontally, vertically, tilted, concave vs. convex or both, and/or hybrid, among others.

Layering dimension 410 can relate to spatial layering of devices around a person's workspace, from one to 'n' layers.

Scale dimension 412 can relate to the number of devices combined in one cross-device setup.

Fixture dimension 414 can relate to how devices are configured as a stand-alone setup. For example, devices can be attached to desk, or do they function as a companion for another device (e.g., smaller devices attached to a large interactive whiteboard).

Form dimension 416 can relate to the setup of the constellations. For example, homogeneous setups can use similar devices. Heterogeneous setups can include devices of varying size or different capabilities.

Modality dimension 418 can relate to which input and/or output devices form part of the multi-device setup. Input modalities can be multitouch (e.g., many of the illustrated examples use multi-touch tablets), physical keyboards, and/or cameras. Output modalities can be screens, projectors, and/or other hardware.

Dynamic dimension 420 can relate to how often the spatial configuration of devices changes. The spectrum can run from permanent setups, to configurations that change every few weeks/days/hours/minutes, to continuous changes.

As shown on chart 400B of FIG. 4B, user dimension 422 can relate to a workspace for single user interactions, multi-user remote collaboration, and/or multi-user co-located interactions.

Reach dimension 424 can relate to how close the devices are physically positioned in relationship to the user. For instance, the devices can be directly in front, in arms reach, further away but reachable, and/or far, for example.

Approach dimension 426 can relate to different directions of approach when moving one device closer to another. For instance, the moving device can approach from the left or right side of the stationary device; from the top or bottom of the stationary device; from the front or back of the stationary device; or perpendicular to the stationary device.

Spatial sensing dimension 428 can relate to the fidelity of spatial sensing available relative to devices of a constellation. The fidelity can range from no sensing to sensing of presence, 1DOF, 2DOF, 3DOF, 6DOF, and/or 7DOF+ (including overall formation).

Sensor mapping dimension 430 relates to how the sensor input is mapped to any interactive application behavior. For instance, the range of sensor input can extend through no mapping, binary threshold (e.g., crossing a distance threshold between two devices triggers action), gradual, linear continuous, and/or non-linear continuous.

Behavior dimension 432 can relate to the way applications implement different action behaviors in response to sensed input. For instance, action behaviors can be manually selected (e.g., if there is no application opened), or based upon suggested options at a confidence that indicates user confirmation should be obtained (e.g., when there is no clear preference in the system of a default choice). Other action behaviors can involve showing options but pro-actively triggering the default option, and pro-actively automatically triggering an action (for example when only one option is available), among others.

FIGS. 5-17 collectively illustrate example application scenarios and interaction techniques consistent with the concepts introduced relative to FIGS. 4A and 4B. These examples illustrate how AirConstellations can seamlessly manage the locations and poses of devices to enable applications to easily respond to spatial (re)configurations and inter-device proximity.

Figure 5:
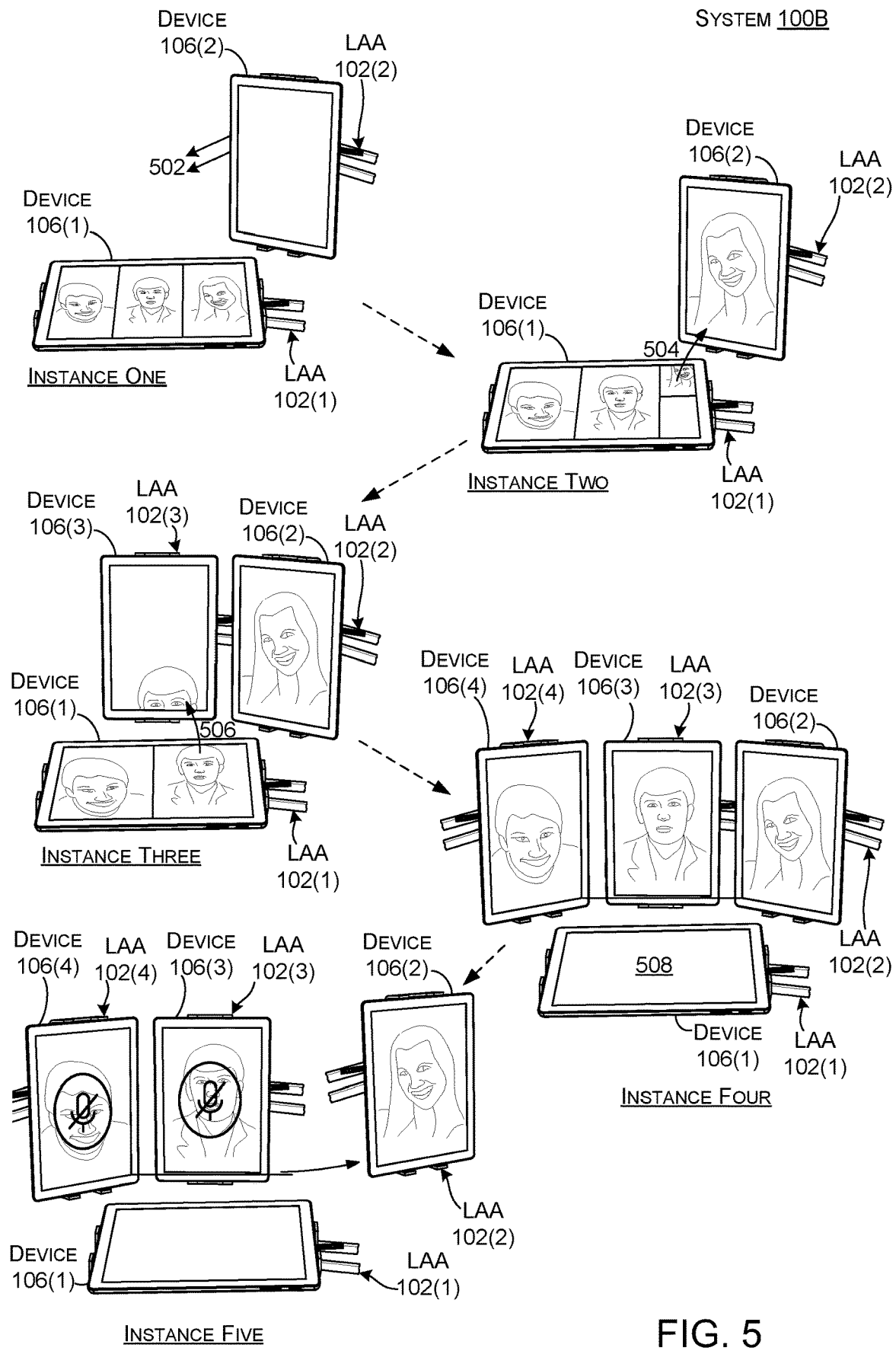

FIG. 5 illustrates how a multi-device video conference application can allow dynamic reconfiguration of the task and person space utilizing AirConstellations. Thus, AirConstellations can transition from group chats to face-to-face side conversations, incorporating light-weight use of tools such as whiteboards during chats, and enabling document sharing through both touch and tilt gestures.

This example illustrates the separation of person and task space during video calls, related to techniques on large surfaces or tilting single-device screens. This technique can be translated to dynamic in-air multi-device workspaces, offering more degrees of freedom for possible reconfigurations and adjustments.

Instance One shows first device 106(1) positioned on location-aware armature 102(1) running a video conference call that includes several remote participants. The user is moving second device 106(2) positioned on location-aware armature 102(2) closer to first device 106(1) as indicated by arrows 502. As a result of tracked location and pose data from the location-aware armature 102(2), the video feed of individual participants can be transferred from the horizontal screen of first device 106(1) to the screen of second device 106(2) using a sliding gesture (indicated by arrow 504) in the direction of the second device as shown in Instance Two.

Instance Three shows the introduction of third device 106(3) on third location-aware armature 102(3). The user can make another sliding gesture indicated by arrow 506 to move another individual remote video participant to the third device 106(3).

Instance Four shows introduction of fourth device 106(4) on fourth location-aware armature 102(4). At this point, the user has moved the fourth individual person in the conference call to the fourth device 106(4). Once all three remote participants have been moved to separate screens (recreating the experience of four people facing each other in a physical meeting), the device 106(1) in the center can be transitioned into task space mode and open the collaborative whiteboard sketching app of the team at 508. Thanks to the flexibility of the location-aware armatures 102, one can position the camera of each individual device 106 optimally (with each of the three-person space devices) independently from the ergonomic placement of the task space device (i.e., placing the whiteboard sketching app horizontally in front for sketching or writing on the surface).

Instance Five shows the ability for ad-hoc proxemic-aware transitions to individual side conversations. Changing from a group conversation to a two-person side conversation can be difficult to do in digital videoconferencing compared to how easily and intuitively the present implementations can initiate a side conversation with someone in a physical meeting. AirConstellations supports a light-weight technique to transition from group to individual conversations, inspired by proximity-aware physical surrogates and leveraging proxemic interactions. During the video conversation, the user can take any of the three speakers' proxy view, separating them from the device formation of Instance Four, and bring the screen closer towards themselves (moving along spectrum of reach dimension 424 (FIG. 4B), decreasing proxemic distance, moving that individual speaker from the social or common space to the personal space), to initiate a private side conversation. As shown in Instance Five, when doing so, the audio channel to the other person can remain open, but can be muted for all other participants, allowing for a conversation in private. All other meeting participants can continue the ongoing conversation (with audio/video). As the user moves the device 106(2) back to the group of other devices, the side conversation ends.

This implementation allows devices to transition roles from mobile to semi-fixed and back again as desired by the user. The users can take their mobile devices and join them to a semi-fixed AirConstellations formation. For example, in the illustrated group video conversation a person can dock their device 106, such as a tablet or phone, into one of the AirConstellations location-aware armatures 102. The device 106 can be recognized by the armature mount (302, FIG. 3A). For instance, the device recognition can be accomplished by comparing the sensed orientation of the mount to the internal orientation sensor of the device to recognize docking or removing and the mobile device then becomes part of the current constellation setup.

Alternatively, in some implementations, the pose-aware holders (or the location-aware armatures, or even the device snapped into the holder) may contain a microswitch, hall effect sensor, capacitive coupling, RFID tag, or other mechanism that can be used to sense when the device is attached or detached to the armature, as well as potentially to identify the device itself. Another option can involve an authentication mechanism, like an RFID (not unlike an employee badge) that can both identify and authenticate the user and device in the simple action of attaching to the pose-aware holder. So immediately the device can be joined without need to log-in or authenticate as separate steps.

In light of the discussion above, mobile devices can join semi-fixed device formations when desired (moving along the design space spatial sensing dimension 428 (FIG. 4B) from left to right), and disconnected when again desired as a mobile, portable device.

The discussion now turns to the behavior dimension 432 introduced in relation to FIG. 4B. The behavior dimension can relate to feedforward and manual confirmation of application behavior. For revealing opportunities of spatial-aware techniques, the feedforward techniques can include aspects of behavior 432 and sensor mapping 430 (e.g., sensor input). The feedforward dimension can tell users what the result of their action will be.

Note that in the discussion above relative to FIGS. 1A-5, devices 106 are illustrated positioned in location-aware armatures 102 and the function of the location-aware armatures 102 was explained in detail. For sake of brevity in FIGS. 6-16, the location-aware armatures 102 are generally not illustrated. For purposes of explanation, assume that the described devices are associated with location-aware armatures that can track the location and pose of the devices.

Figure 6A:
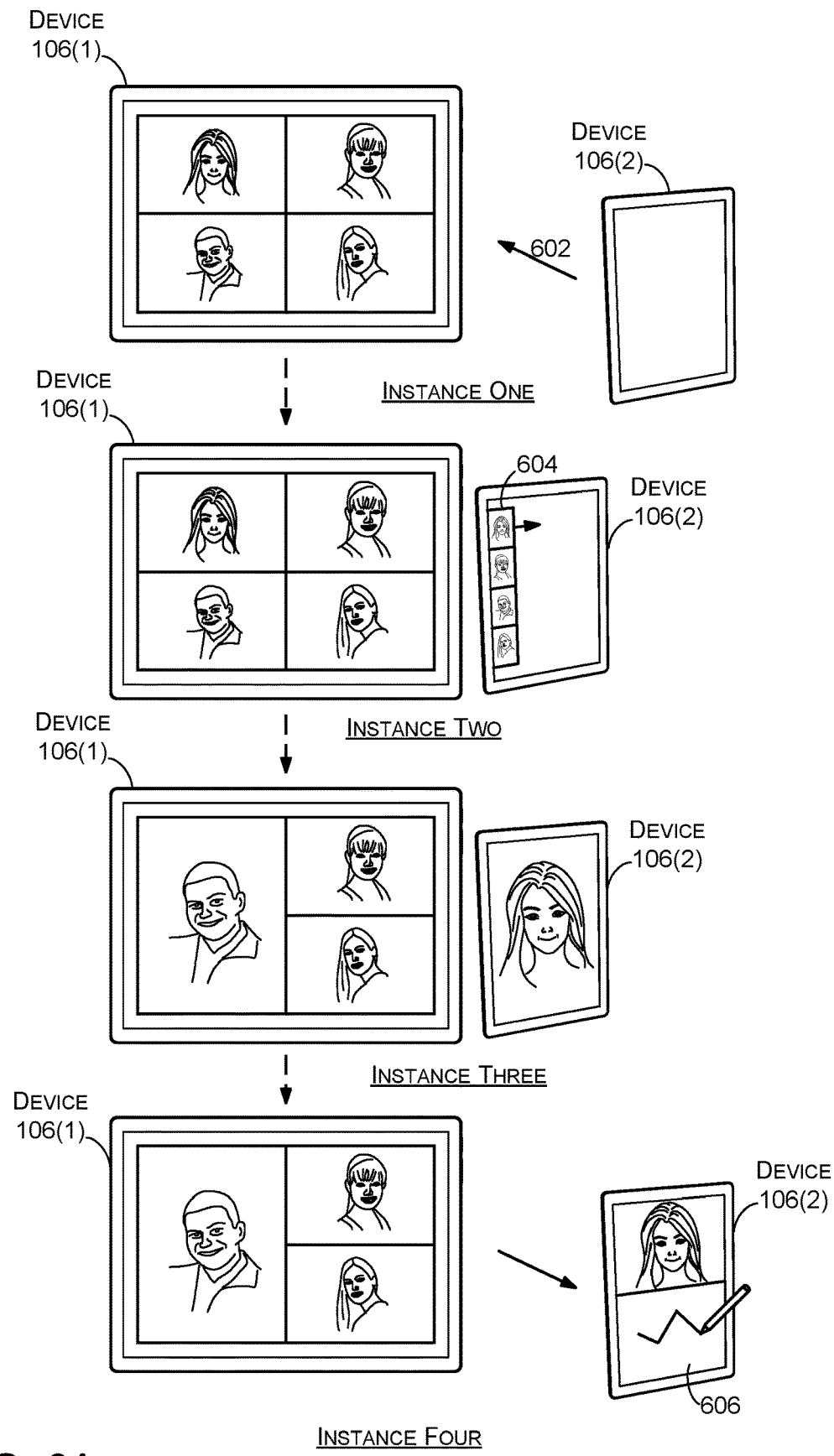
Figure 6B:
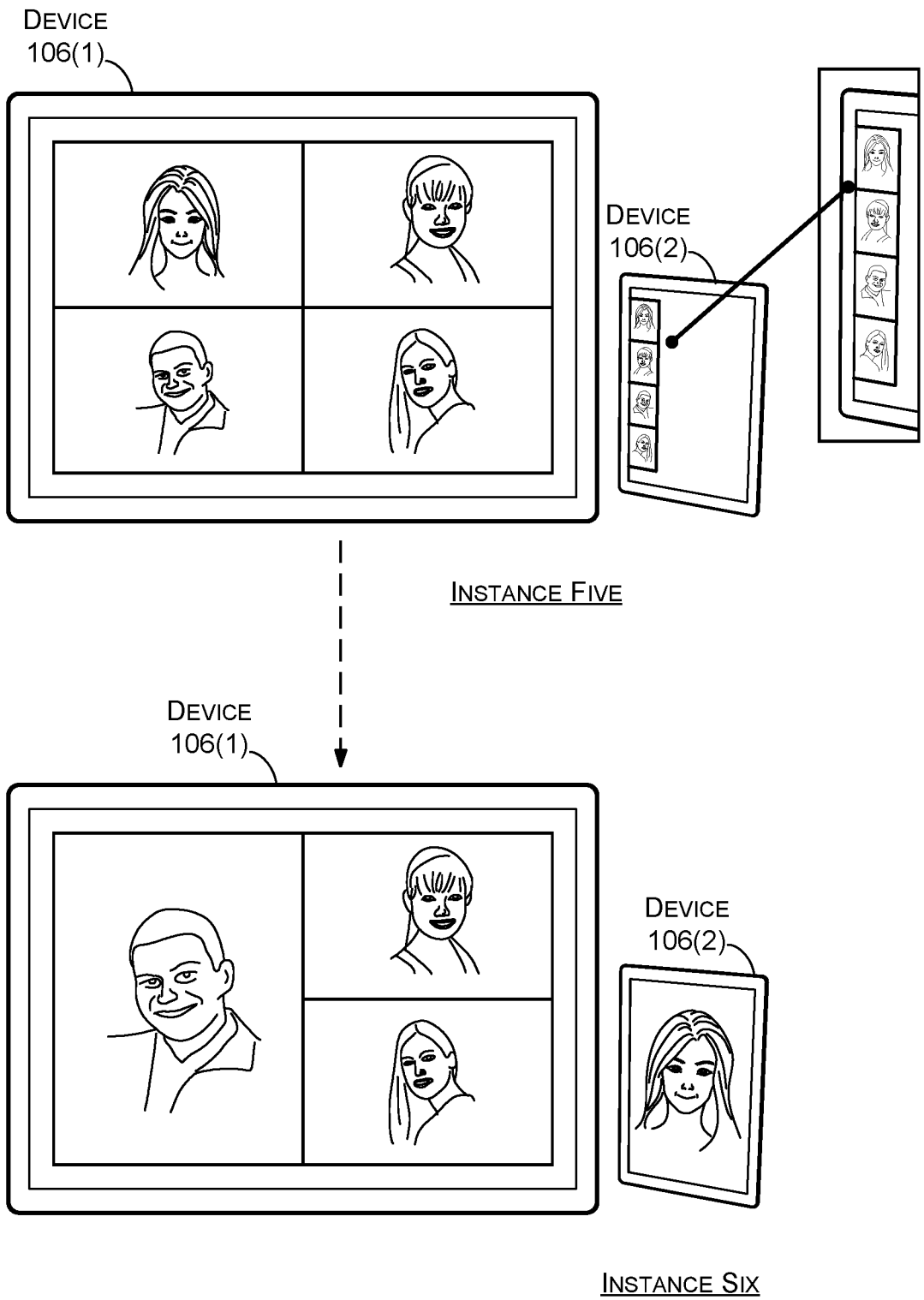

FIGS. 6A and 6B collectively show multi-device video conferencing. Note that for sake of brevity, Instance One through Instance Four show ad-hoc breakout conversations and collaborative whiteboards for sharing designs. Instance Five and Instance Six show using companion devices together with large display devices, such as wall mounted display devices.

At Instance One, when a person brings second device 106(2) closer to first device 106(1) as indicated by arrow 602 a side-panel fades in with preview-icons of all four remote participants of the conversation as shown at 604 in Instance Two. This semi-transparent panel provides a feedforward preview of the options to move one of the remote participants' video stream to the other device. The user can simply click and drag one of the camera preview icons (in this case the top one) from the side bar as shown at Instance Three to move the participant to the new device 106(2). If no option is selected, the panel can fade out, such as after five seconds.

AirConstellations can also provide light-weight, transient use of collaborative tools. AirConstellations also supports ad-hoc, transient application behaviors during video conversations. For example, when separating the tablet away from the device formation and moving it closer, while tilted like a drawing board (introduced as orientation & structure dimension 408 of FIG. 4A), AirConstellations can fade in a shared whiteboard from the bottom half of the screen as shown at 606 of Instance Four of FIG. 6A, giving easy access for shared writing and drawing. Moving the tablet back as part of the device formation makes the whiteboard canvas disappear.

AirConstellations can enable homogeneous device setups and companion devices. Similar techniques can be used in heterogeneous setups (introduced as form dimension 416 in FIG. 4A), for example, where a person's interaction with a video call on the device e.g., a large wall screen is augmented with a smaller AirConstellations companion (e.g., second) device in the form of the tablet. This aspect was introduced as fixture dimension 414 in FIG. 4A. In another variation, Instance Five of FIG. 6B shows moving a smaller device 106(2) (e.g., the tablet) in front of a larger device 106(1) (e.g., a large display) reveals the feedforward video previews, the user can then move one remote participant to the tablet in Instance Six and invoke the digital drawing canvas.

Note in this case, the base of the location-aware armature, rather than being mounted on a desk or wall, could be a portion of the large display device or otherwise attached to a known portion of the large device (e.g., a relatively stationary device). Given that the device may be able to convey information about itself, such as its display dimensions, having the location aware armature fixed at a known location on the large device can allow a single location-aware armature to provide information about the smaller portable device relative to the larger display device. For instance, the larger display device could be fixed vertically on the wall and the housing of the larger display device can include a location-aware armature that can be unobtrusively tucked away. When a user approaches and wants to create a constellation, the user can swing out the location-aware armature and position their mobile device on the location-aware armature. At this point, the single location-aware armature can track the location and pose of the smaller device relative to the larger wall mounted device.

Figure 7A:
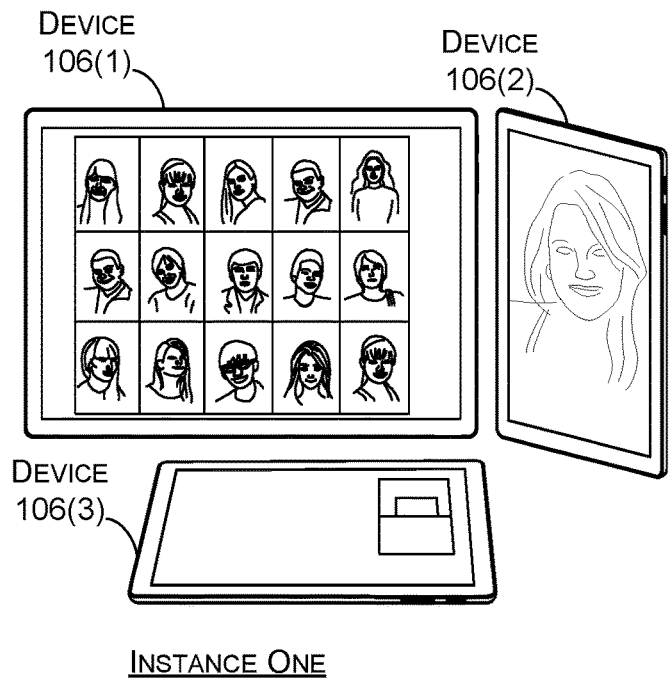
Figure 7A:
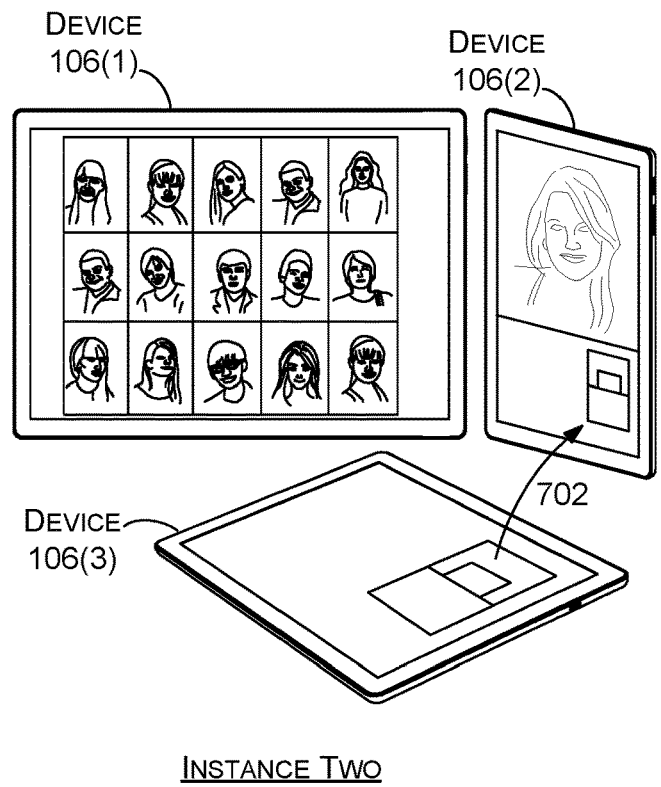
Figure 7B:
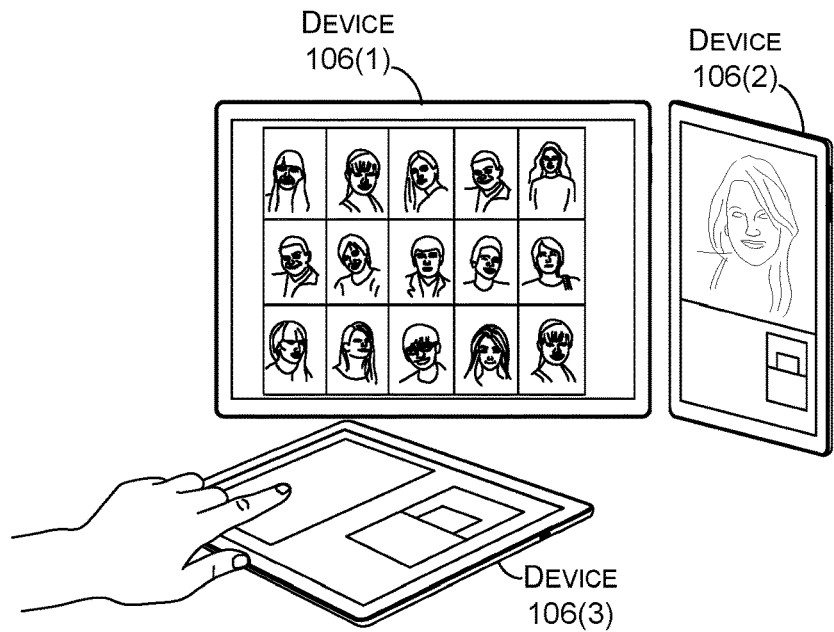
Figure 7B:
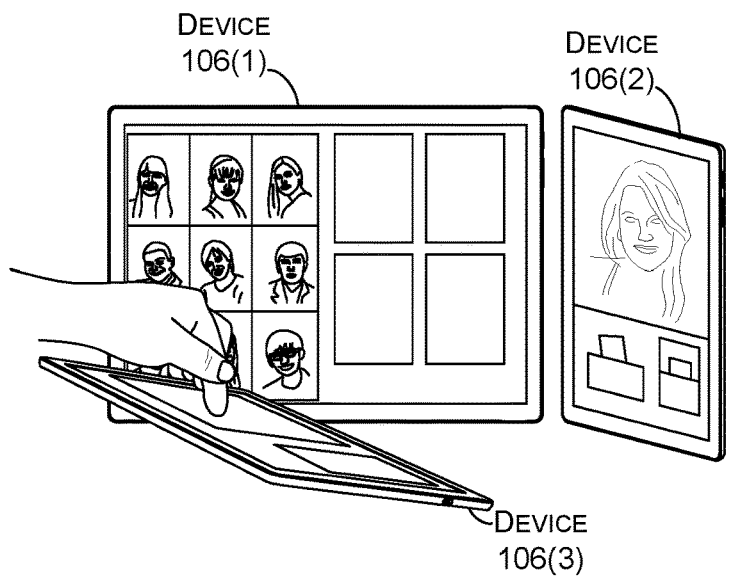

FIGS. 7A and 7B collectively show an example of how AirConstellations can facilitate sharing of documents during video conferencing through directional gestures. On FIG. 7A, Instance One and Instance Two show sharing documents in video conferencing by sliding towards one person to share. In this case, device 106(3) is moved toward device 106(2) to share content from device 106(3) with the user presented on device 106(2) as indicated by arrow 702.

From another perspective, Instance One shows that a user can share documents with other participants by using directional sliding gestures into the direction of the proxy-screen of another participant of the conversation. This can create a transient shared portfolio shown at Instance Two. A fade-in animation indicates this document sharing, where the shared portfolio slowly fades in when performing the sliding gesture—and the sharing can be revoked easily by reversing the gesture.

On FIG. 7B, Instance Three and Instance Four show tilting a device to share with everyone in the video conference. AirConstellations can allow sharing with a group by tilting devices. Sharing documents with all participants during video conferencing could be done through a more expressive gesture—such as tilting devices (in this case, device 106(3)). A user can select the document to share on the screen as shown at Instance Three, followed by tilting the device into the direction of the device formation with all remote participants as shown in Instance Four, which shares the document with everyone. By design this gesture can require more effort compared to the sliding gesture for sharing with only one individual. This effort delta can match the effort of the gesture with its impact (i.e., minimal gesture for sharing with one person, more effortful gesture when sharing with all participants).

AirConstellations can provide proximity-dependent cross-device behaviors that can facilitate managing multiple application windows, tool palettes, as well as help redirect input devices when using productivity applications (e.g., presentation software, email clients, or development tools).

Figure 8:
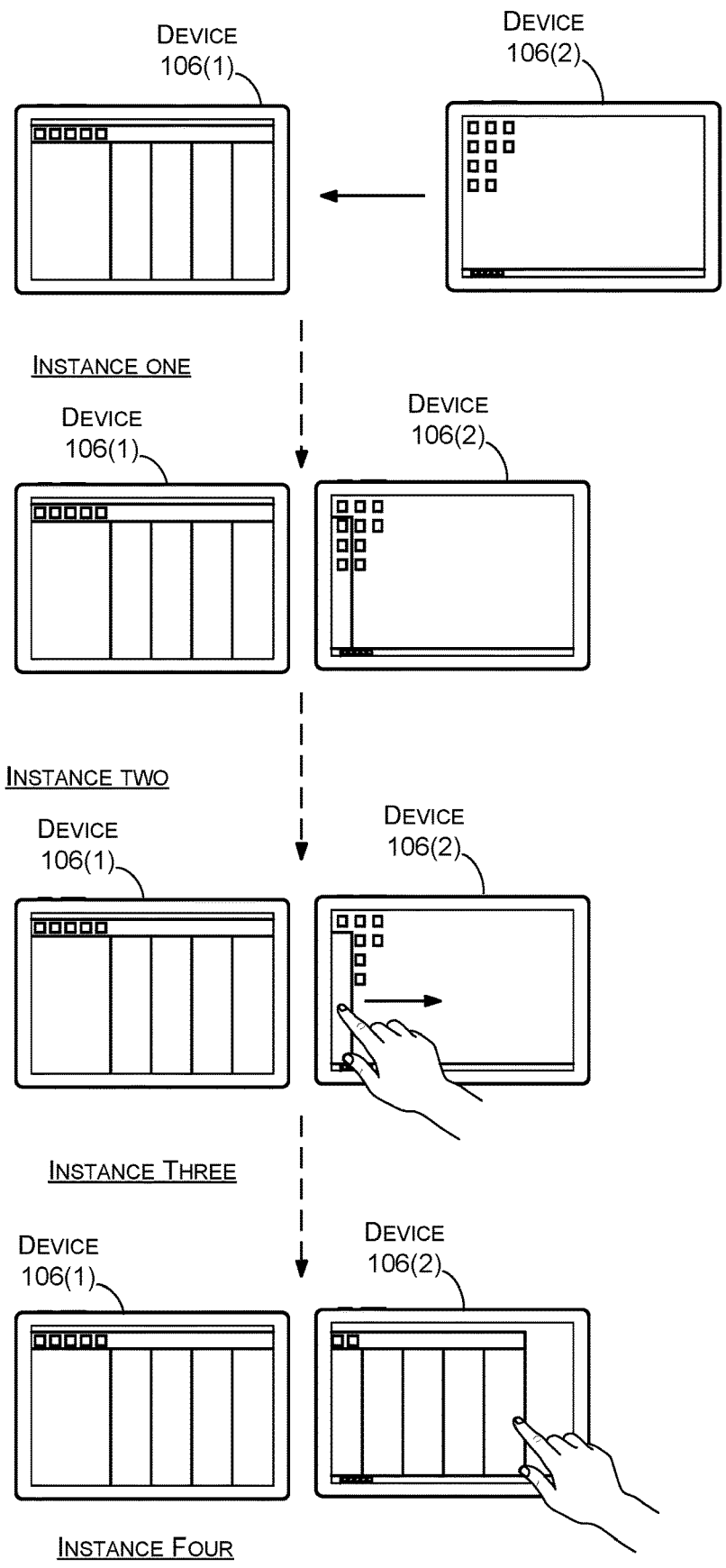
FIGS. 8, 11, and 16 show elevational views of example collectively managed devices in accordance with some implementations of the present location and pose-aware concepts.

FIG. 8 shows that users can easily distribute tool palettes across devices when using productivity applications. Air-Constellations can provide cross-device hand-over of tool palettes. When a person moves device 106(2), such as tablet into the proximity of another device 106(1) running an application at Instance One, tool palettes that can be transferred onto the second device 106(2) can be shown in a semi-transparent overlay on the side of the screen as shown at Instance Two. The person can then select and expand the tool palettes by dragging, spreading them out on screen as shown in Instances Three and Four. For the tool palettes transfer technique, AirConstellations can use feedforward to indicate action possibilities. For instance, these techniques can map the sliding-in/out of the palette window of Instance Two directly to the continuous movement of the approaching device introduced above as the sensor mapping dimension 430 in FIG. 4B. A touch gesture can confirm the action, otherwise the preview can slide away (or simply fade out gradually, so as to avoid a distracting motion animation) with no action.

Figure 9:
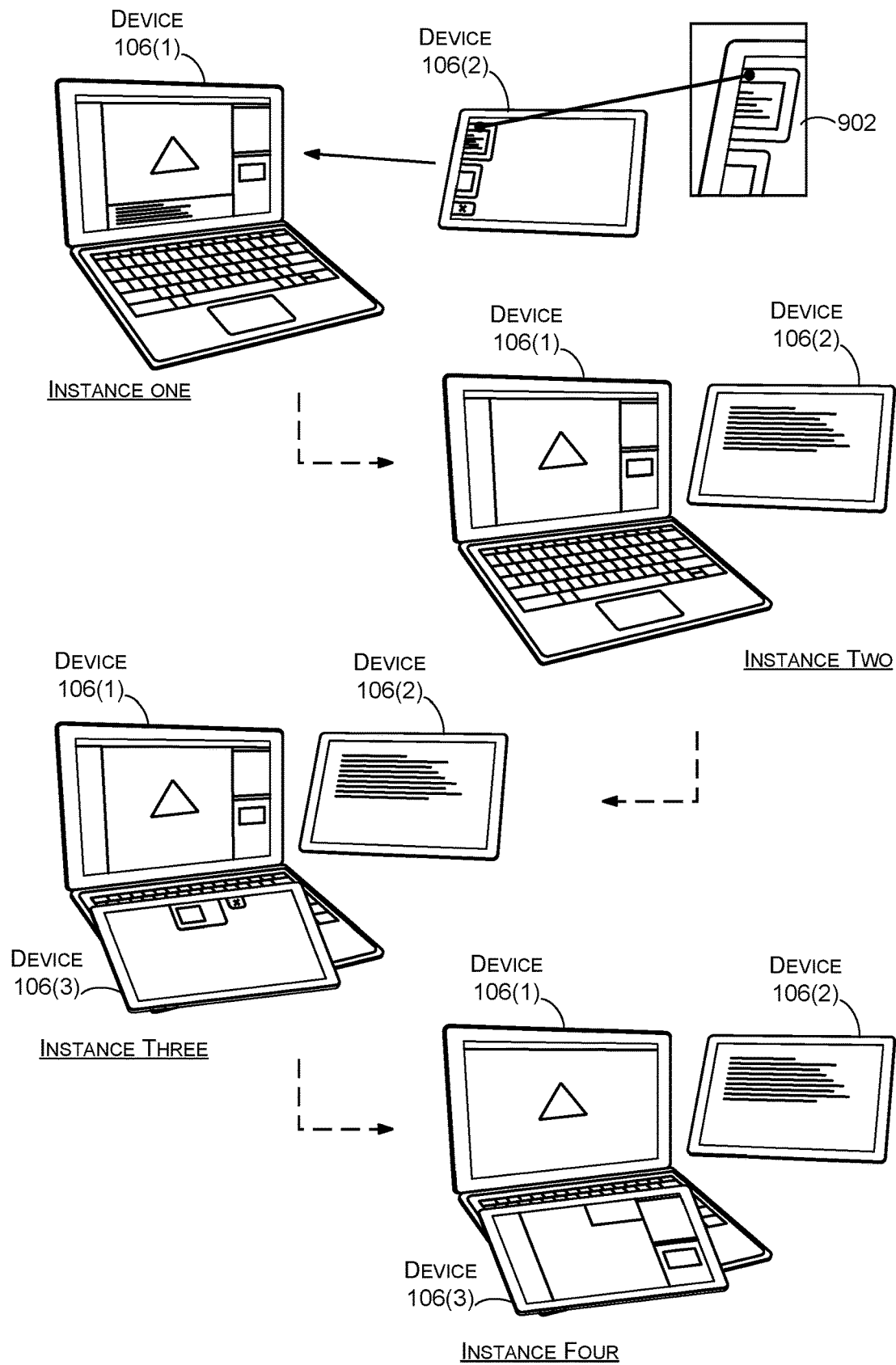

FIG. 9 shows examples of multiple available options for proximity-based application behavior offered by AirConstellations. When implementing proximity- and orientation-dependent application behaviors for device formations, there can be cases where multiple options are available to choose from (e.g., different actions resulting from bringing two devices closer together). This aspect is introduced above in FIG. 4B as the behavior dimension. For example, as shown in Instance One of FIG. 9, when a user moves device 106(2), such as a tablet next to device 106(1), such as a laptop running a development tool, a sidebar 902 can suggest three possible outcomes: moving the code editor to the tablet, moving tool palettes, or no action. In this case, a default option (moving code editor, shown at the top) is automatically selected when continuing the movement of the tablet in the direction of the laptop. At Instance Three, when the developer later moves another device 106(3) closer, options are again shown, but no default action is available. Instance Four of FIG. 9 shows the user decides to manually move the tool palettes to the third device 106(3).

Figure 10:
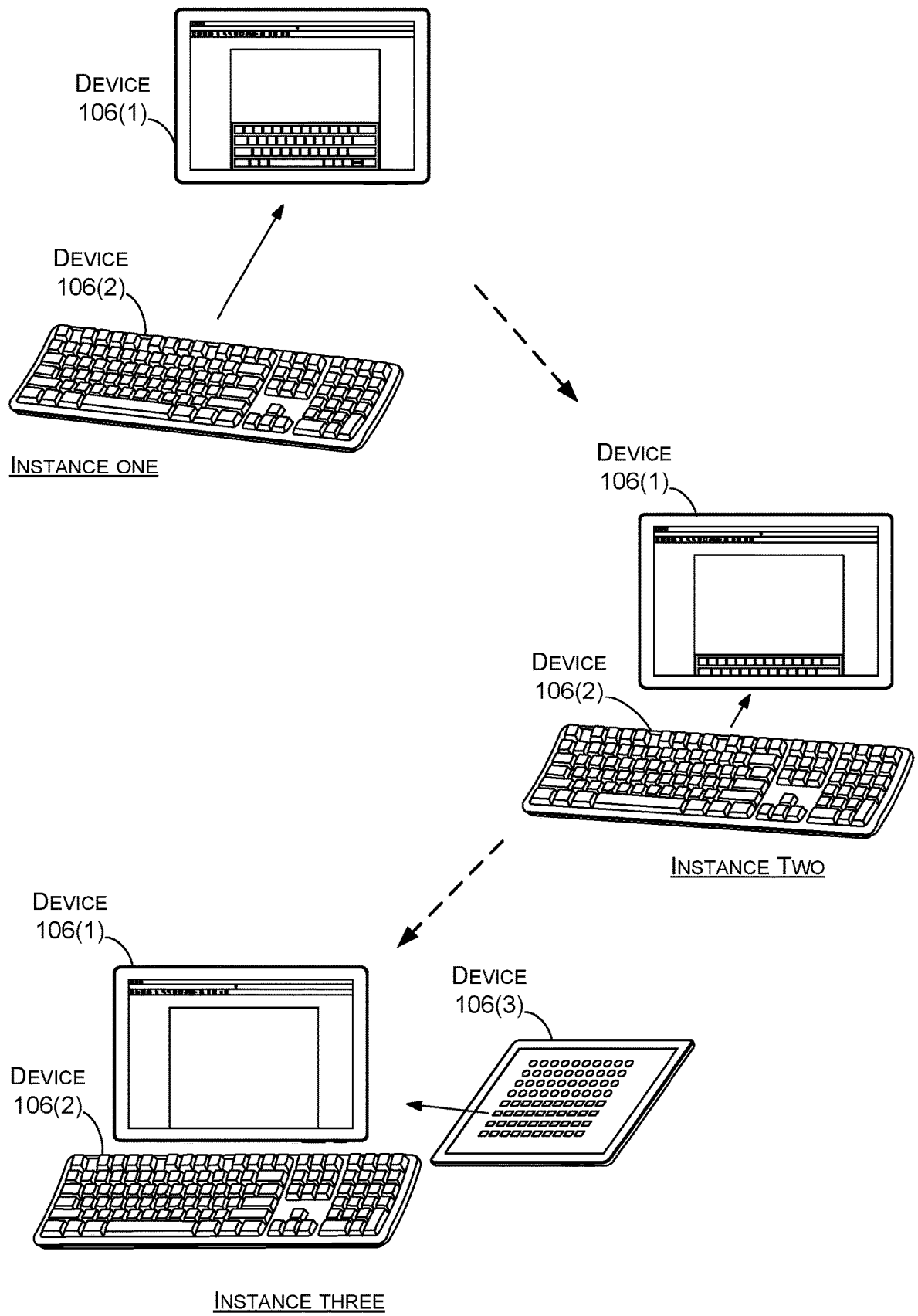

FIG. 10 shows an example of proximity-dependent input redirection. In the examples above, each device 106 can be a free-standing device, e.g., notebook, tablet, phone, etc. In this example, the second device 106(2) can be a peripheral device, such as a keyboard. This aspect is introduced above as the modality dimension 418 relative to FIG. 4A. As shown at Instance One, when the second device 106(2) in the form of a physical keyboard is brought in proximity to device 106(1) screen real-estate dedicated to a virtual keyboard on device 106(1) can be reallocated for other purposes as shown at Instance Two. For example, when moving the physical keyboard closer to a tablet, the onscreen soft keyboard fades out and the device instead uses the physical keyboard. In this case, keyboard input can be redirected to the closest device—or alternatively AirConstellations can use spatial gestures like swiping in the direction of the device 106(1) or another device to determine where the keyboard input should be directed to.

AirConstellations can also offer spatially-aware soft-keyboard extensions. For instance, when moving another device 106(3) close to the physical keyboard (e.g., device 106(2)), device 106(3) can augment the functionality available rather than duplicating the functionality of the physical keyboard. For example, the device 106(3) can function as an extended keyboard to show pre-sets of emojis as shown in Instance Three of FIG. 10. The kind of virtual keyboard extension can depend on the application currently in focus and/or other context. For example, with a chat messenger app the keyboard could show emojis and GIF images, for a video editor pre-sets of command functions, and for a vector drawing application it could show a visual clipboard. In other implementations, peripherals beyond keyboards such as touchpads, stand-alone digitizer pads, cameras, microphones, and/or external hard drives may be associated or redirected to other devices in a corresponding manner.

Figure 11:
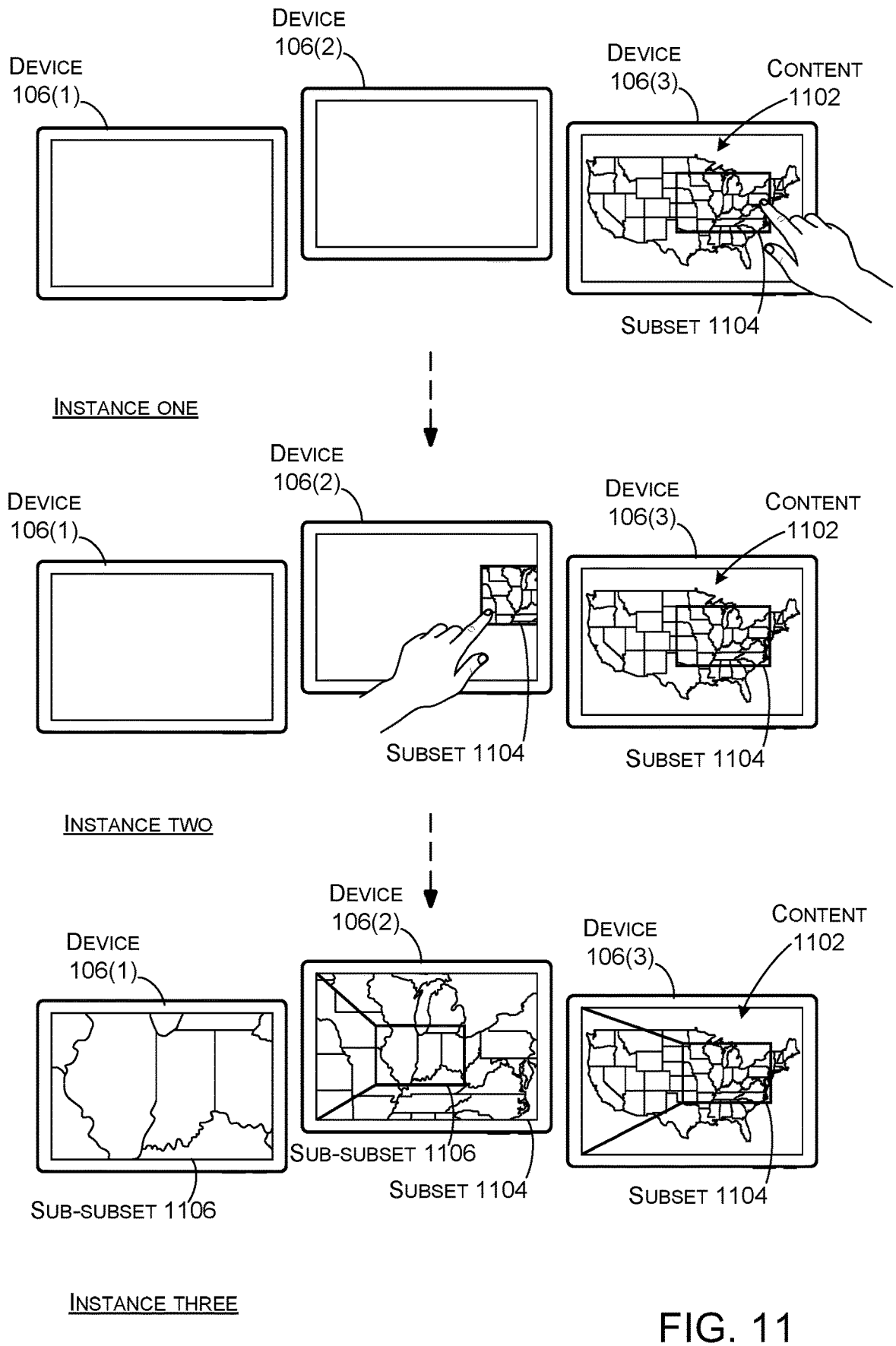

AirConstellations can offer workspace device formations for data analysis. FIG. 11 shows one such example of ad-hoc device federations in the context of data analysis and information visualization applications. In particular, feedforward animations can be utilized to facilitate forming device formations, and how to enable ad-hoc transitions from joint to personal, individual views.

AirConstellations enables fast, reconfigurable multi-display workspace extensions. Similar to traditional multi-monitor desktop setups, users can reposition any of the AirConstellations devices so that they function as an additional, ad-hoc screen extension (e.g., arrangement dimension 406 introduced relative to FIG. 4A). Instance One of FIG. 11 shows placing devices 106(1), 106(2), and 106(3) next to each other. The user can add the display to the current formation arrangement—and can update the spatial configuration of the desktop layout. Users can then use touch gestures to extend content across the displays. For instance, in the illustrated example, device 106(3) includes a GUI of content 1102. The user is selecting a subset 1104 of the content. Instance Two shows the user dragging the subset 1104 of content to device 106(2). The GUI of device 106(2) can be dedicated to displaying this subset of content and thus can display the subset of content at a higher resolution than device 106(3). Similarly, a sub-subset 1106 of the content can be selected from device 106(2) for display on device 106(1). Instance Three shows the sub-subset 1106 of content shown at a higher resolution. Thus, taken collectively, the devices can display content of interest at different levels of granularity.

From another perspective, this example shown in FIG. 11, enables multiple 'overview plus detail views' of different magnification levels as shown in Instance Three. The spatial awareness of AirConstellations means that physically rearranging devices does not require any manual reconfiguration of display arrangements in the system settings. This feature lowers the barrier for more frequent physical reconfigurations, even when needed for only a short amount of time.

Figure 12:
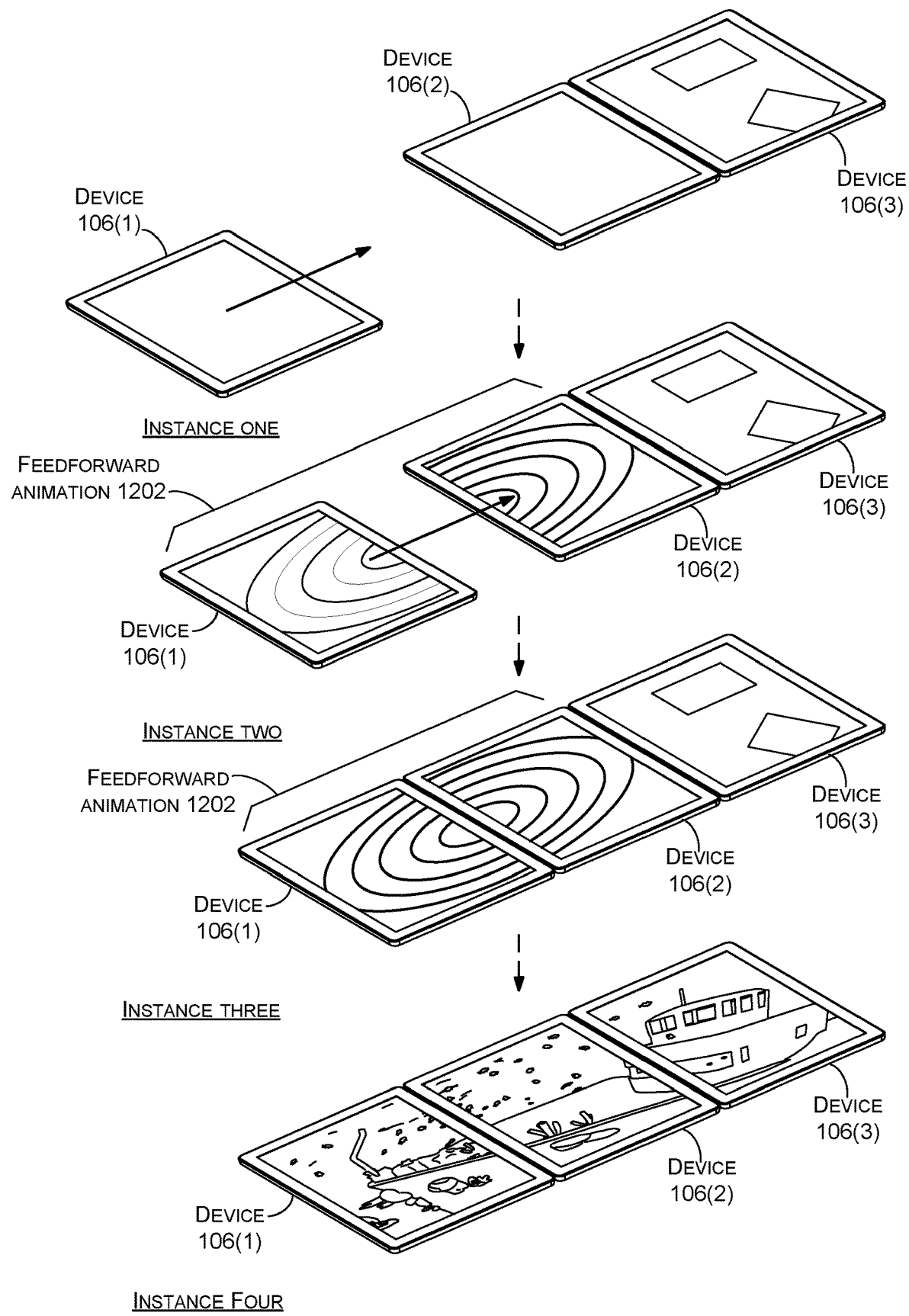

FIG. 12 shows another feedforward animation example. This example involves an ad-hoc tabletop-like interactive surface. The feed forward feature shows pending merging of multiple devices 106(1)-106(3) into a continuous surface (e.g., common GUI). Instance One shows device tracking of device 106(1) as the user moves it toward devices 106(2) and 106(3). Instance Two shows a feed forward visualization or animation 1202 being presented across devices 106(1) and 106(2) to indicate to the user that AirConstellations determined that the user wants to join device 106(1) with devices 106(2) and 106(3) and the determined spatial relationship. In the illustrated configuration, the feedforward animation 1202 can entail a fluid wave/ripple animation across devices 106(1) and 106(2). The center of the animation indicates that AirConstellations calculated that the user is going to position device 106(1) against device 106(2) and that the content should be spread across their displays.

If AirConstellations successfully determined (e.g., predicted) the user wanted to operate the devices cooperatively and the desired orientation as reflected in the feedforward animation 1202, then the user can simply continue to move them together as shown in Instance Three. If the prediction is not what the user wanted to do, the user can take another action, such as moving the devices apart. If the prediction is correct, AirConstellations can automatically start presenting content collectively across the devices as shown in Instance Four.

To summarize FIG. 12 shows another feedforward technique for indicating opportunities for joint device formations. Instance Two shows a fluid wave/ripple animation when a user brings horizontally oriented tablets close to one another to indicate the possibility to merge these devices into a tabletop-like formation. This is an example of the arrangement dimension 406 of FIG. 4A and involves moving from separate to continuous formation. The intensity of the wave animation increases when moving the devices closer together. This is an example of the sensor mapping dimension 430 of FIG. 4B involving a non-linear mapping. When both devices are very close, a second animation, such as an expanding arrow, can indicate the newly formed merged view of the devices. Both animations can disappear once the surfaces (e.g., device edges) are physically touching, and this new formation can then be used like a continuous interactive surface—e.g., using cross-device pinch-to-zoom as shown in Instance Four. This example shows how the devices can be seamlessly and effortlessly (for the user) transitioned to an ad-hoc collaborative tabletop-like device formation.

Figure 13:
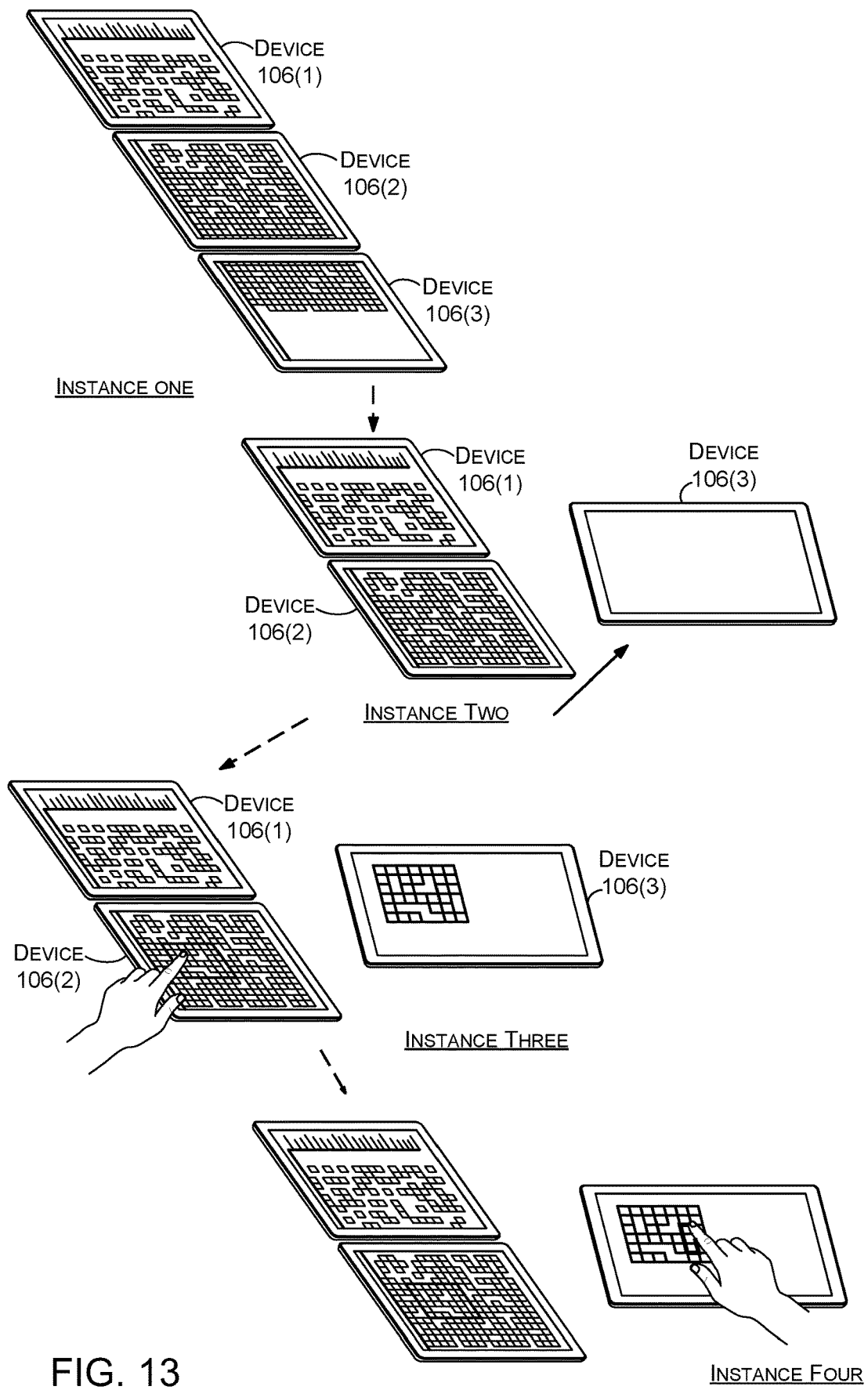

FIG. 12 shows devices being joined in a constellation. FIG. 13 shows devices being separated to operate individually (e.g., transitioning from joint to individual views of interactive data sets).

At Instance One, FIG. 13 shows three devices 106(1)-106(3) that are physically abutting one another and being operated cooperatively to collectively show content. Instance Two shows the user moving device 106(3) away from the other two devices 106(1) and 106(2). This movement can result in a separate, decoupled viewing window on the device. At this point, the common content is no longer presented on device 106(3). Devices can transition from a joint device formation (similar to the one of Instance Four of FIG. 12) to an individual, decoupled representation of the dataset.

From another perspective, Instance One of FIG. 13 shows another AirConstellations feature. In Instance One, three devices 106(1)-106(3) are operating cooperatively in a horizontal arrangement to collectively present content. When analyzing a dataset on a horizontal multi-tablet formation, a user can take one of the devices (e.g., device 106(3)) and move it apart from the formation as shown at Instance Two. Instance Three shows that the user can manually select parts of the dataset through direct touch on the shared view showing a magnified view of the data selection on the break-out device 106(3). Instance Four shows the user can then directly interact with the dataset on the break-out device 106(3).

Figure 14:
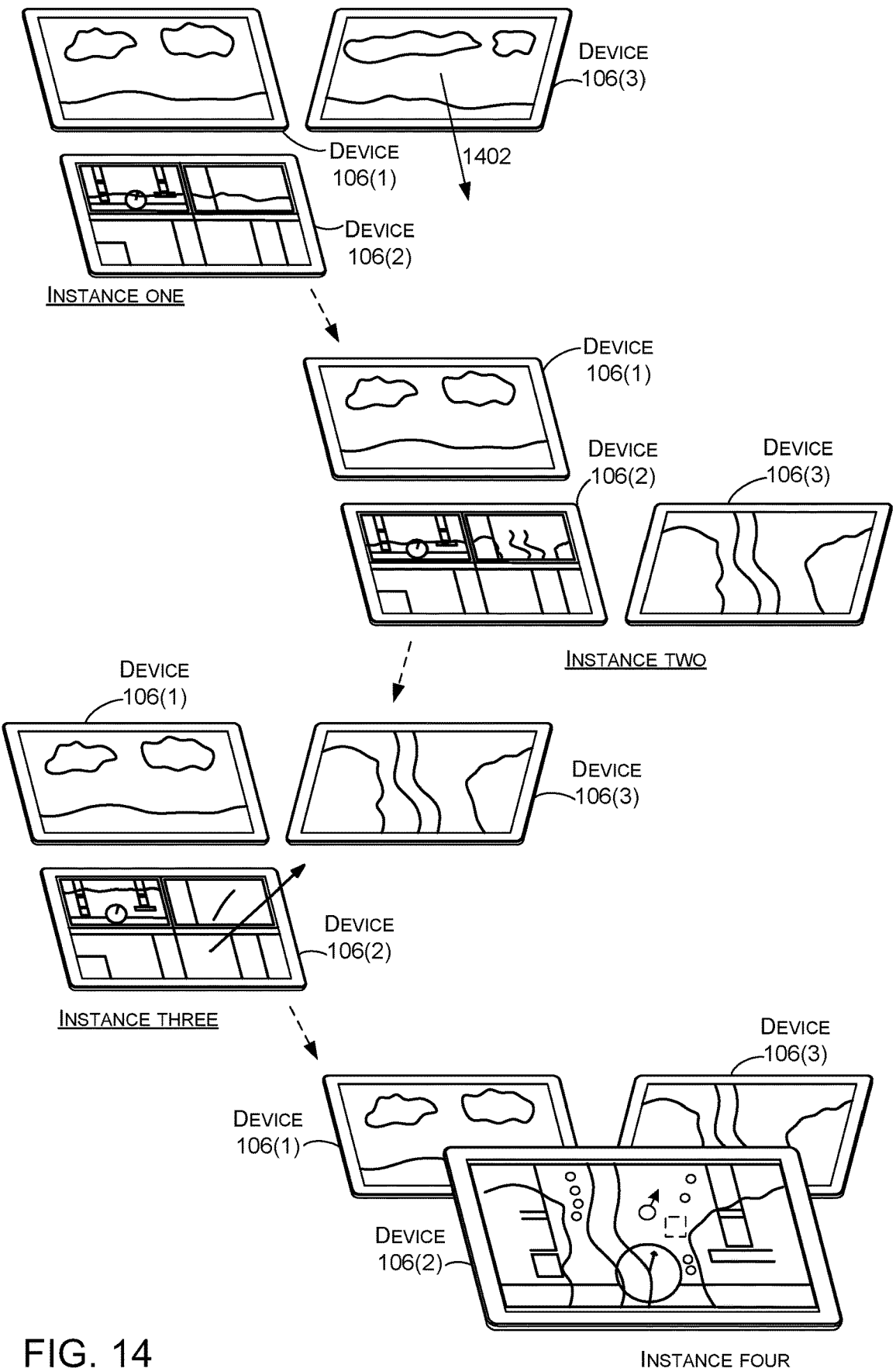

FIG. 14 shows another example of orientation-aware windows relating to semantic zoom of controls in a flight simulator. Instance One shows a flight simulator display on device 106(2). At this point, device 106(2) is simulating controls and devices 106(1) and 106(3) are simulating the view from the cockpit windows with the plane flying relatively level (e.g., a view of the horizon with sky toward the top and ground toward the bottom). The user is pulling device 106(3) from the back to the front (e.g., toward the user) and tilting the device back as indicated at 1402.

Instance Two shows the view on device 106(3) changing according to the orientation and position set by the user. In this example, the user tilted the device back so the view correspondingly adjusts to show more of the ground and less of the sky (e.g., as if the user is looking down toward the ground from the cockpit). Device 106(1) continues to show the horizon and device 106(2) continues to show the flight simulator controls. Alternatively, devices 106(1) and 106(2) could be synchronized so each shows the same angle relative to the horizon.

Instance Three shows the user moving device 106(2) with the simulator controls toward device 106(3). Responsively, Instance Four shows the content of the simulator controls updated to reflect a map of the land shown on device 106(2). The map is zoomed in because the user conveyed his/her desire to see zoomed content by moving device 106(2) toward device 106(3). While not easily conveyed at the scale of the drawing, various information can be conveyed on the map, such as natural and man-made features in the map area (e.g., where device 106(3) is looking). Thus, the zooming shown in Instance Four can be termed semantic zooming because it is performed in the context of the user action of Instance Three.

From another perspective, spatially-aware devices enabled by AirConstellations can also augment gameplay setups. For example, in the illustrated flight simulator game example, the user can spatially position multiple viewing windows of the aircraft in Instance One of FIG. 14. Each device either represents one of the windows or the flight control console. Moving any of the aircraft windows changes the field-of-view outside the window in response to the change of position and/or orientation as shown in Instance Two. This behavior is closest to the use of spatial-aware lenses. Alternatively, moving any of the flight control console tablets closer as shown in Instance Three can trigger semantic zoom of the main control of that panel as shown at Instance Four.

Figure 15:
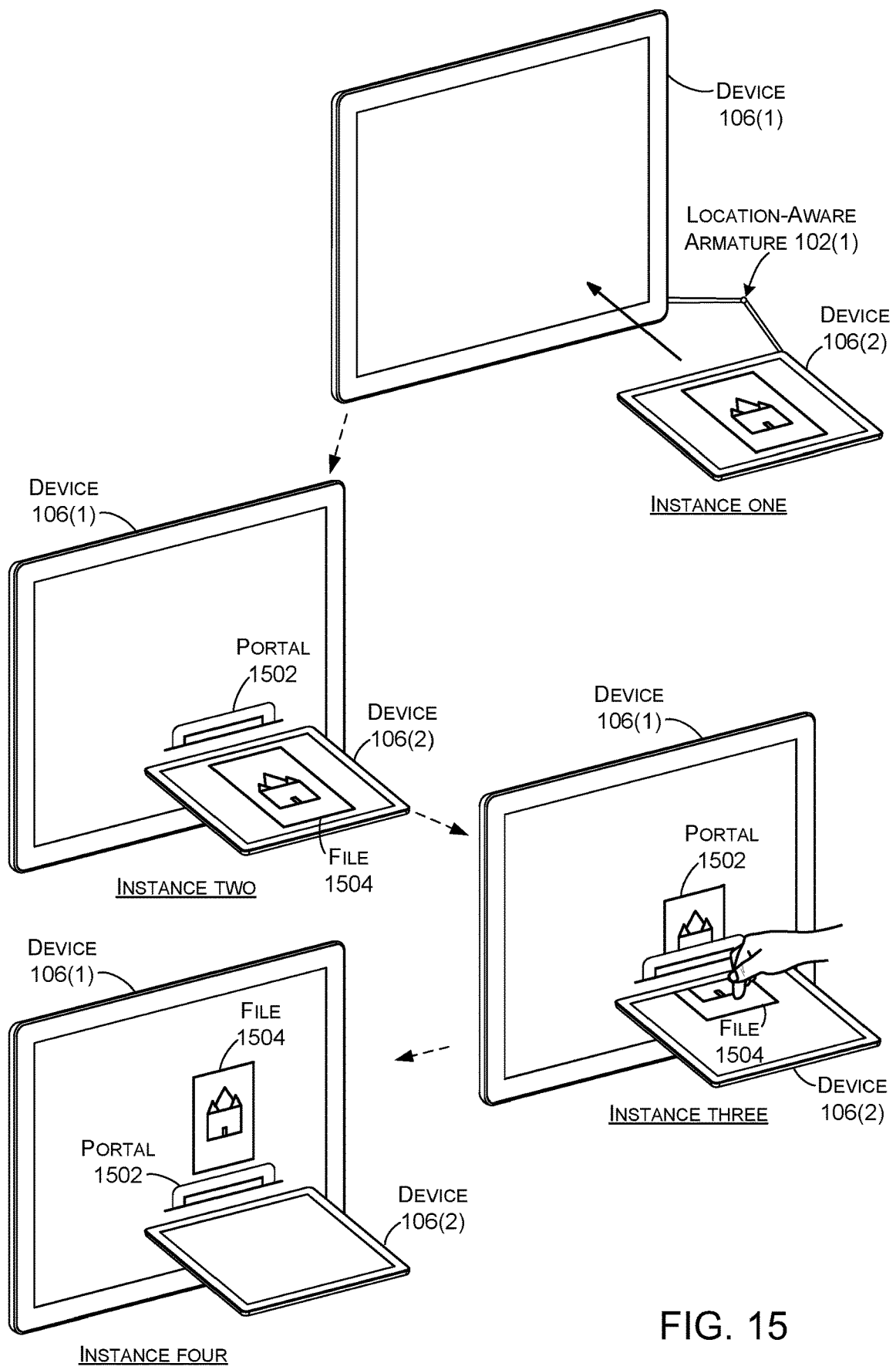

FIG. 15 relates to AirConstellations supporting devices of different sizes, such as a large device 106(1) and a smaller device 106(2). For instance, the large device 106(1) could be a digital whiteboard configured for a conference room setting. The small device 106(2) could be a device, such as a phone or table belonging to someone engaging the digital whiteboard, such as during a video meeting. In this implementation, as mentioned above, location-aware armature 102(1) can be secured to the large device 106(1) and can hold the smaller device 106(2). (The location-aware armature 102(1) is only shown relative to Instance One.) The location-aware armature 102(1) can track location and/or pose information for both devices relative to one another and or to other devices.

Note also that in other configurations, the location-aware armature 102(1) may be secured to a structure, such as the same structure (e.g., wall), that large device 106(1) is mounted to instead of being secured to the large device. The large device may be too large to be readily held by a location-aware armature. In such a case, various sensors can be positioned directly on the large device, for instance to convey location only since the pose may be fixed. Thus, not all devices in a federation need to be associated with a location-aware armature and not all devices need to be associated with identical types and/or numbers of sensors.

FIG. 15 shows how AirConstellations can enable seamless file sharing. Instance One of FIG. 15 shows the user moving the smaller device 106(2) close to the larger device 106(1) in a generally orthogonal orientation. Instance Two shows a portal 1502 automatically opening on the large device to allow file transfer between devices. Instance Three shows the user readily transferring a file 1504 from device 106(2) to device 106(1) via the portal 1502. In this example, the file 1504 is a drawing. In this implementation, the user simply touches and drags the drawing on the small device 106(2) toward the portal 1502 on the large device 106(1) using a slide gesture. Instance Four shows the file 1504 on the large device 106(1).

This example illustrates seamless and easy transfer portals with whiteboard sketching applications. Close proximity between devices can open ad-hoc file transfer portals. This feature relates to the approach dimension 426 of FIG. 4B. When moving device 106(2) perpendicularly towards the large device 106(1), a transfer portal proxy can be shown on both on the tablet and the large display—establishing a direct virtual transfer link, which allows the user to move sketches from the tablet to the large device (e.g., wall display) with a sliding gesture or other user action.

Figure 16:
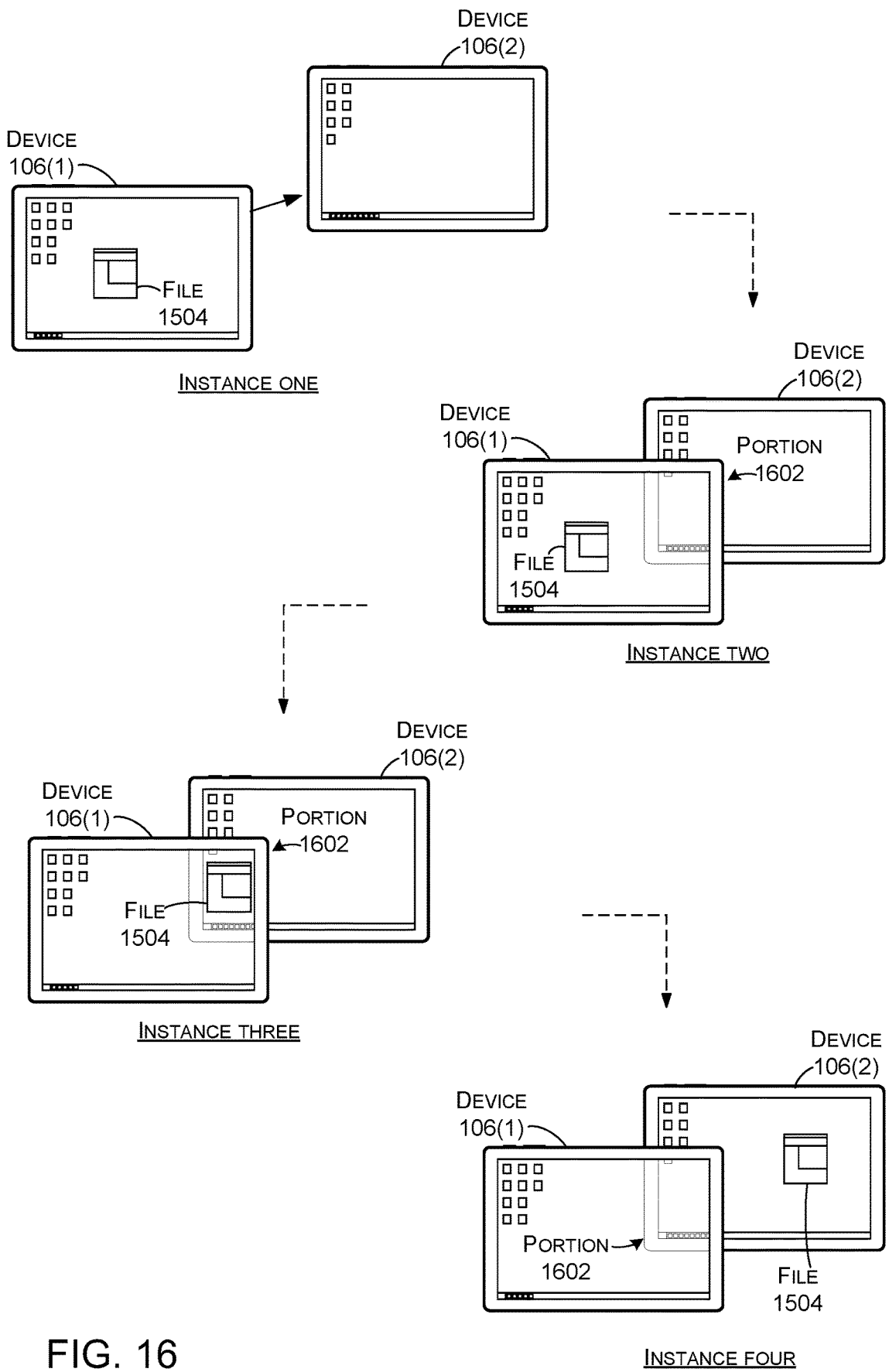
Figure 17:
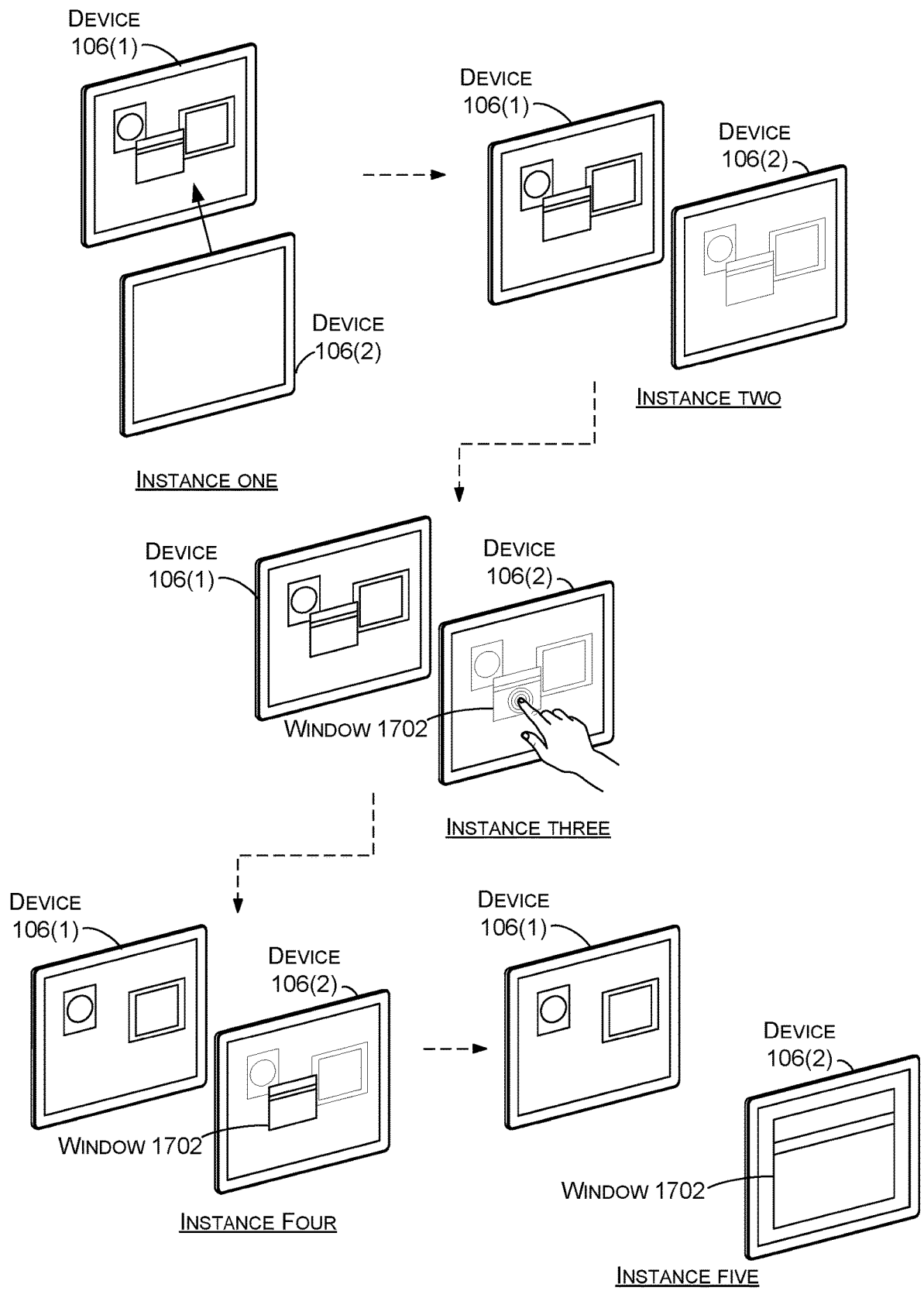

FIGS. 16 and 17 collectively illustrate how AirConstellations can enable system-wide cross-device behaviors in the operating system of the devices. FIG. 16 illustrates a see-through desktop portal for easy transfer of applications or files. FIG. 17 illustrates a graphical window manager hand-over function.

FIG. 16 shows an example light-weight see-through portal across desktops. This relates to the layering dimension 410 introduced above relative to FIG. 4A. Layering devices on top of or in front of each other can facilitate OS-level operations across devices. The see-through desktop portal is activated when one device is directly placed on top of another device. This is illustrated in FIG. 16 starting at Instance One and Instance two where devices 106(1) and 106(2) are arranged on generally parallel planes and the user slides device 106(1) toward and over a portion 1602 of device 106(2). In this case, portion 1602 of device 106(2) is occluded by device 106(1). The occluded portion of the GUI of device 106(2) can be presented on device 106(1), such as in a semi-transparent manner. The user can then drag and drop files 1504 or windows from one desktop to another by dragging the files into the occluded portion 1602 as shown in Instances Three and Four. AirConstellations can initiate this functionality when the devices are physically overlapping (instead of being positioned side-by-side) as a unique trigger for this OS-level function.

From another perspective, layering or occlusion of one device by another can trigger an alternative or separate space of gestures mapped to system-level behaviors such as migrating a window (application or portion thereof) from one device to another. These are behaviors that tend to be controlled at an operating system level. The operating system can employ graphical windows and can respond to window border dragging type of operations implemented in the graphical window manager or shell layer, as opposed to application behaviors implemented inside of the applications.

FIG. 17 shows example layering for cross-device window management and application migration. Instance One shows the user moving device 106(2) in front of and occluding device 106(1). Instance Two shows the user movement initiating a window transfer view. In the window transfer view, all application windows from device 106(1) in the back can be shown semi-transparently on the device 106(2) in front. AirConstellations can use proximity and orientation of the devices 106 to facilitate window management across devices.

Instance Three shows the user can select one of the windows 1702 by engaging the front device 106(2). This action will move the window 1702 to the front device 106(2) as shown at Instance Four. Instance Five shows how the user can then pull the device 106(2) closer (e.g., increase distance between devices) to enlarge the selected window on the front device 106(2). This example illustrates how fine-grained inter-device proximity and occlusion information can be used to trigger a specific device operation (the window view), which is then confirmed through explicit user input (direct touch).

The description above provides examples of how AirConstellations can provide fluid and easy transitions in multi-device setups. As explained above AirConstellations can enable semi-fixed workspaces. Location-aware armatures or other mechanisms can provide device location and pose information. This setup can provide a means for users to arrange multiple devices in persistent and self-stable, yet highly reconfigurable, in-air device formations to readily support a variety of activities and workflows. This approach lowers the threshold of user effort required to make an arrangement (or fine-grained rearrangement) optimal for the current task and situation. AirConstellations greatly expands the vocabulary of device formations while making it very easy to adjust or reconfigure a workspace. This helps users get the most out of the limited working space typical of "work at home" setups. AirConstellations enables arrangements that include the 3D space around the user with device displays raised at varying angles and relative orientations within this volume—rather than being limited to the 2D, largely horizontal, supporting surfaces of status quo workstations.

AirConstellations can provide easy transitions between fixed, semi-fixed, and mobile configurations. For quick transitions with the fluid use of devices in either semi-fixed or fully mobile roles, a simple clamp-based attachment of AirConstellations can facilitate devices that come and go to varying degrees. In the semi-fixed case, users can easily pull a device partially away from a formation to focus on particular details in a visualization or pull aside someone in a small-group video conference, for example. Users can easily "grab and go" (detach a device) to go fully mobile at a moment's notice. As such, a tablet, netbook, or smartphone could serve as a logical hub to migrate device, task, and interactive state between different work or home-office locations, including other AirConstellations setups.

AirConstellations implementations allow a range of user choices from spatially-aware tracking to manual configurations. Beyond the affordance of the location-aware armatures for plug & play use as well as quick rearrangement, the integrated tracking system affords mutual spatial awareness between multiple armatures. This allows the interaction techniques to leverage the spatial setup of devices as an implicit parameter of actions that users take. Users can put displays where they want them, in a direct manner in-air, rather than indirectly configuring display layouts through control panels and so forth. This directness and simplicity, and the corresponding reduction in time and effort, may lower the threshold for users to reconfigure or adjust displays more frequently, whether for ergonomic, social, or task-driven needs.

Using the AirConstellations platform can offer dynamic in-air device formations for the next generation of multi-device workspace setups in a variety of use-cases. One of the core characteristics of AirConstellations setups is their ability to support and retain the affordances of mobile interaction, while at the same time allowing semi-fixed devices to be (re-)configured in different physical arrangements. The illustrated application scenarios showcase the potential of such highly dynamic workspace configurations, with spatially-aware behaviors, feedforward, and other interaction techniques for flexible and delightful use of technology best supporting tasks at hand.

The illustrated scenarios represent a selection of the overall design space associated with ad-hoc dynamic device formations for co-located collaborative applications. These device formations could support collaborative tasks—using shared devices and users' own personal devices in concert to merge device formations and people formations. Other armature form factors, such as custom haptic feedback arms are contemplated as are the use of dynamic in-air device formations for VR applications, and actuated changes of device formations (e.g., extending).

Figure 18:
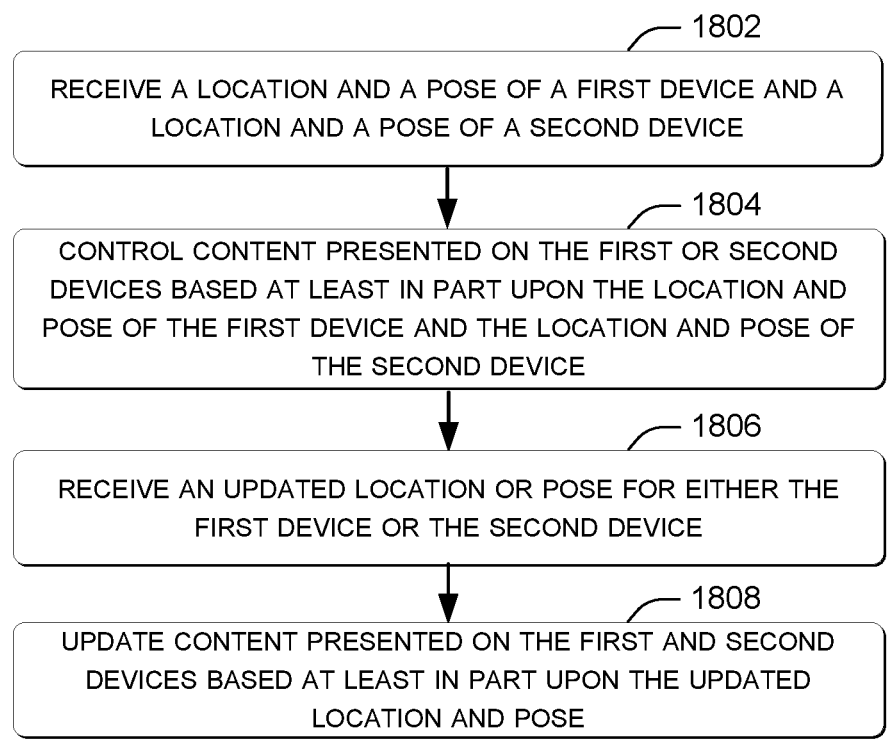
FIGS. 18 and 19 show example location and pose-aware multi-device content management flowcharts in accordance with some implementations of the present concepts.

FIG. 18 illustrates a flowchart of a collective device control technique or method 1800. At block 1802, the method can receive a location and a pose of a first device and a location and a pose of a second device. In some cases, the location and pose of the first device can be received from a first self-stable in-air tracking mechanism upon which the first device is positioned and the location and the pose of a second device can be received from a second self-stable in-air tracking mechanism upon which the second device is positioned. Individual devices can be manifest as devices that have displays, such as tablets, smart phones, notebook computers, etc. Other devices may be peripherals or input devices, such as keyboards, among others.

At block 1804, the method can control content presented on the first and/or second devices based at least in part upon the location and pose of the first device and the location and pose of the second device.

At block 1806, the method can receive an updated location or pose for either the first device or the second device. For instance, the updated location and pose can be received from either the first self-stable in-air tracking mechanism or the second self-stable in-air tracking mechanism.

At block 1808, the method can update content presented on the first and second devices based at least in part upon the updated location and pose.

Figure 19:
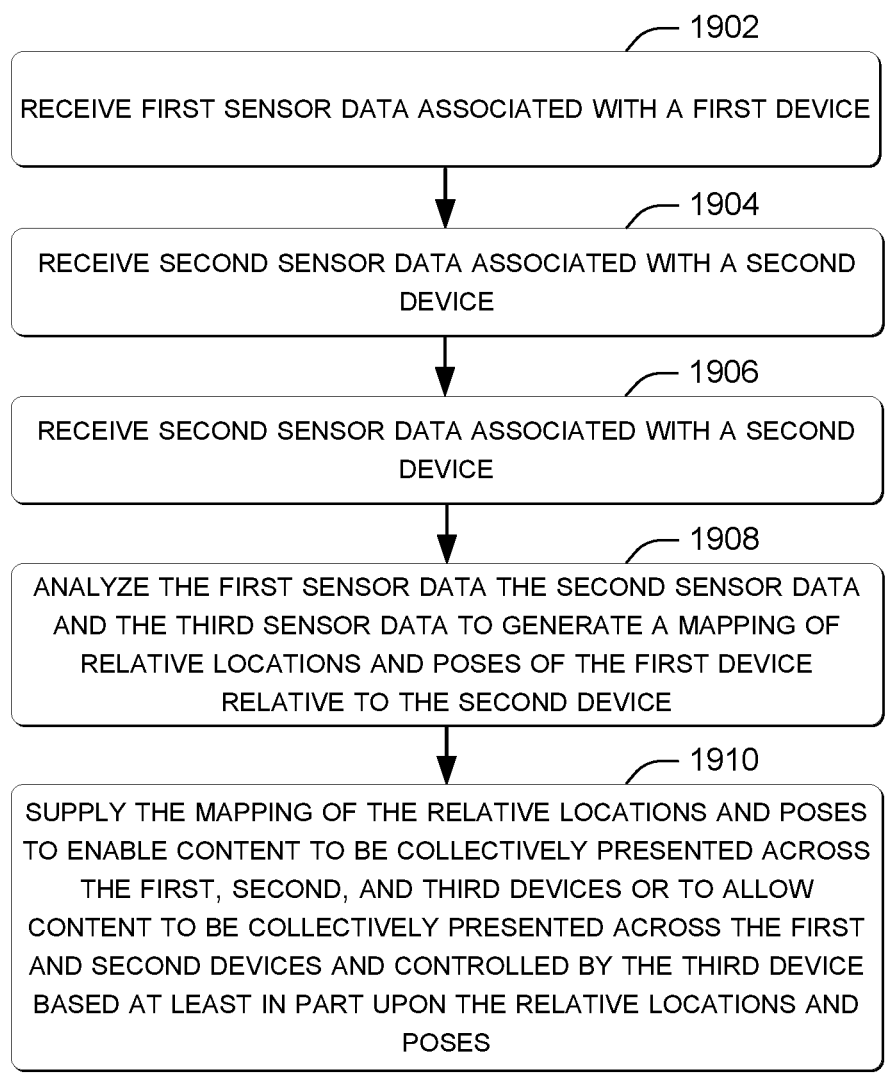

FIG. 19 illustrates another flowchart of a collective device control technique or method 1900. At block 1902, the method can receive first sensor data associated with a first device. For instance, the first sensor data can be received from a first location-aware armature that is holding the first device.

At block 1904, the method can receive second sensor data associated with a second device. For instance, the second sensor data can be received from a second location-aware armature that is holding the second device.

At block 1906, the method can receive third sensor data associated with a third device. For instance, the third sensor data can be received from a third location-aware armature that is holding the third device.

At block 1908, the method can analyze the first sensor data, the second sensor data, and the third sensor data to generate a mapping of relative locations and poses of the first device relative to the second device and the third device.

At block 1910, the method can supply the mapping of the relative locations and poses to enable content to be collectively presented across the first, second, and third devices or to allow content to be collectively presented across the first and second devices and controlled by the third device based at least in part upon the relative locations and poses.

The described methods can be performed by the systems and/or elements described above and/or below, and/or by other devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Various methods of manufacture, assembly, and/or use for these devices and/or associated location-aware armatures are contemplated beyond those shown above relative to FIGS. 1A-19.

Although techniques, methods, devices, systems, etc., pertaining to collective location and pose-aware device management are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a system comprising storage configured to store computer-readable instructions and a processor configured to execute the computer-readable instructions to receive a location and a pose of a first device from a first self-stable in-air tracking mechanism upon which the first device is positioned and a location and a pose of a second device from a second self-stable in-air tracking mechanism upon which the second device is positioned, control content presented on the first or second devices based at least in part upon the location and pose of the first device and the location and pose of the second device, receive an updated location and pose for either the first device or the second device from the first self-stable in-air tracking mechanism or the second self-stable in-air tracking mechanism, and update content presented on the first and second devices based at least in part upon the updated location and pose.

Another example can include any of the above and/or below examples where the storage and processor are located on the first device.

Another example can include any of the above and/or below examples where the controlling content comprises collectively presenting the content across the first and second devices when the first and second devices are located adjacent to one another at similar poses.

Another example can include any of the above and/or below examples where when the received updated location and pose indicates that the first device is occluding a portion of the second device, the updating comprises presenting content from the second device on the first device, and wherein the occluding triggers an alternative space of gestures mapped to system-level behaviors.

Another example can include any of the above and/or below examples where when the received updated location and pose indicates that the first device is positioned orthogonal to the second device and the location of the first device is approaching the location of the second device, the updating comprises opening a file transfer portal across the first device and the second device.

Another example can include any of the above and/or below examples where the first device and the second device both include displays, or wherein the first device includes a display and the second device comprises an input device.

Another example can include any of the above and/or below examples where when the input device comprises a physical keyboard and the updated location and pose indicates the second device is being moved toward the first device, the updating the content comprises removing a virtual keyboard from the first device.

Another example includes a system comprising storage configured to store computer-readable instructions and a processor configured to execute the computer-readable instructions to receive first sensor data associated with a first device, receive second sensor data associated with a second device, receive third sensor data associated with a third device, analyze the first sensor data, the second sensor data, and the third sensor data to generate a mapping of relative locations and poses of the first device relative to the second device, and supply the mapping of the relative locations and poses to enable content to be collectively presented across the first, second, and third devices or to allow content to be collectively presented across the first and second devices and controlled by the third device based at least in part upon the relative locations and poses.

Another example can include any of the above and/or below examples where the receiving first sensor data comprises receiving the sensor data from a first location-aware armature secured to a structure and the receiving second sensor data comprises receiving the sensor data from a second location-aware armature secured to the structure, and wherein the receiving third sensor data comprises receiving the sensor data from a third location-aware armature secured to the structure, and wherein the analyzing comprises identifying the locations and poses of the first, second, and third devices relative to the structure.

Another example can include any of the above and/or below examples where the analyzing comprises mapping the first, second, and third devices and movements of the first, second, and third devices in 3D space relative to the structure.

Another example can include any of the above and/or below examples further comprising applying the mapping to an application rendering applied to all of the first, second, and third device.

Another example includes a first location-aware armature comprising a first pose-aware holder configured to hold various sizes of computing devices and to sense a three-dimensional (3D) location and pose of a first computing device held in the first pose-aware holder and a second location-aware armature comprising a second pose-aware holder configured to hold various sizes of computing devices and to sense a 3D location and pose of a second computing device held in the second pose-aware holder to provide the location and pose of the first and second computing devices relative to one another.

Another example can include any of the above and/or below examples where the first location-aware armature comprises a mount for securing the first location-aware armature to a structure and further comprising a first sensor on the mount and configured to track location information of the mount.

Another example can include any of the above and/or below examples where the location-aware armature comprises a first four-bar linkage rotationally connected to the mount and further comprising a second sensor configured to sense a rotational orientation of the first four-bar linkage relative to the mount.

Another example can include any of the above and/or below examples where the system further comprises a third sensor positioned on the first four-bar linkage and configured to sense locational information about the first four-bar linkage.

Another example can include any of the above and/or below examples where the system further comprises a second four-bar linkage rotationally connected to the first four-bar linkage and further comprising a fourth sensor positioned on the second four-bar linkage.

Another example can include any of the above and/or below examples where the pose-aware holder is rotationally connected to the second four-bar linkage and including a fifth sensor positioned on the pose-aware holder and configured to sense a location of the pose-aware holder and a sixth sensor positioned between the pose-aware holder and the second four-bar linkage to sense a pose of the pose-aware holder.

Another example can include any of the above and/or below examples where the first sensor, the second sensor, the third sensor, the fourth sensor, the fifth sensor, and the sixth sensor collectively track the location and pose of the first computing device relative to the structure.

Another example can include any of the above and/or below examples where the second location-aware armature is configured to track the location and pose of the second computing device relative to the structure.

Another example can include any of the above and/or below examples where the first location-aware armature and the second location-aware armature are configured to track the location and pose of the first computing device and the second computing relative to one another.

The invention claimed is:

1. A system comprising:
    storage configured to store computer-readable instructions; and,
    a processor configured to execute the computer-readable instructions to:
        receive a location and a pose of a first device from a first self-stable in-air tracking mechanism upon which the first device is positioned and a location and a pose of a second device from a second self-stable in-air tracking mechanism upon which the second device is positioned,
        control content presented on the first or second devices based at least in part upon the location and pose of the first device and the location and pose of the second device,
        receive an updated location and pose for either the first device or the second device from the first self-stable in-air tracking mechanism or the second self-stable in-air tracking mechanism, and,
        update content presented on the first and second devices utilizing the updated location and pose in a first manner to provide a first functionality where the first and second devices are located adjacent to one another in first relative poses and update the content in a second different manner to provide a second functionality where the first and second devices are located adjacent to one another in second different relative poses.

2. The system of claim 1, wherein the storage and processor are located on the first device.

3. The system of claim 1, wherein the controlling content comprises collectively presenting the content across the first and second devices when the first and second devices are located adjacent to one another at similar poses.

4. The system of claim 1, wherein when the received updated location and pose indicates that the first device is occluding a portion of the second device, the updating comprises presenting content from the second device on the first device, and wherein the occluding triggers an alternative space of gestures mapped to system-level behaviors.

5. The system of claim 1, wherein when the received updated location and pose indicates that the first device is positioned orthogonal to the second device and the location of the first device is approaching the location of the second device, the updating comprises opening a file transfer portal across the first device and the second device.

6. The system of claim 1, wherein the first device and the second device both include displays, or wherein the first device includes a display and the second device comprises an input device.

7. The system of claim 6, wherein when the input device comprises a physical keyboard and the updated location and pose indicates the second device is being moved toward the first device, the updating the content comprises removing a virtual keyboard from the first device.

8. A system, comprising:
storage configured to store computer-readable instructions; and,
a processor configured to execute the computer-readable instructions to:
receive first sensor data associated with a first device,
receive second sensor data associated with a second device,
receive third sensor data associated with a third device,
analyze the first sensor data, the second sensor data, and the third sensor data to generate a mapping of relative locations and poses of the first device relative to the second device and the third device, and,
supply the mapping of the relative locations and poses to enable content to be collectively presented across the first, second, and third devices in a first manner for a first set of poses and in a second manner for a second set of poses or to allow content to be collectively presented across the first and second devices and controlled by the third device in the first manner for the first set of poses and in the second manner for the second set of poses.

9. The system of claim 8, wherein the receiving first sensor data comprises receiving the sensor data from a first location-aware armature secured to a structure and the receiving second sensor data comprises receiving the sensor data from a second location-aware armature secured to the structure, and wherein the receiving third sensor data comprises receiving the sensor data from a third location-aware armature secured to the structure, and wherein the analyzing comprises identifying the locations and poses of the first, second, and third devices relative to the structure.

10. The system of claim 9, wherein the analyzing comprises mapping the first, second, and third devices and movements of the first, second, and third devices in 3D space relative to the structure.

11. The system of claim 10, further comprising applying the mapping to an application rendering applied to all of the first, second, and third devices.

12. A system comprising:
a first self-stable in-air tracking mechanism configured to hold various sizes of computing devices and to sense a three-dimensional (3D) location and pose of a first computing device;
a second self-stable in-air tracking mechanism configured to hold various sizes of computing devices and to sense a 3D location and pose of a second computing device; and,
a processor configured to:
receive a location and a pose of the first device and a location and a pose of a second device,
control content presented on the first or second devices based at least in part upon the location and pose of the first device and the location and pose of the second device,
receive an updated location and pose for either the first device or the second device, and,
update content presented on the first and second devices utilizing the updated location and pose in a first manner to provide a first functionality where the first and second devices are located adjacent to one another in first relative poses and update the content in a second different manner to provide a second functionality where the first and second devices are located adjacent to one another in second different relative poses.

13. The system of claim 12, wherein the first self-stable in-air tracking mechanism comprises a first location-aware armature comprising a first pose-aware holder and the second self-stable in-air tracking mechanism comprises a second location-aware armature.

14. The system of claim 13, wherein the first location-aware armature comprises a mount for securing the first location-aware armature to a structure and further comprising a first sensor on the mount and configured to track location information of the mount.

15. The system of claim 14, wherein the first location-aware armature comprises a first four-bar linkage rotationally connected to the mount and further comprising a second sensor configured to sense a rotational orientation of the first four-bar linkage relative to the mount.

16. The system of claim 15, further comprising a third sensor positioned on the first four-bar linkage and configured to sense locational information about the first four-bar linkage.

17. The system of claim 16, further comprising a second four-bar linkage rotationally connected to the first four-bar linkage and further comprising a fourth sensor positioned on the second four-bar linkage.

18. The system of claim 17, wherein the first pose-aware holder is rotationally connected to the second four-bar linkage and including a fifth sensor positioned on the first pose-aware holder and configured to sense a location of the first pose-aware holder and a sixth sensor positioned between the first pose-aware holder and the second four-bar linkage to sense a pose of the first pose-aware holder.

19. The system of claim 18, wherein the first sensor, the second sensor, the third sensor, the fourth sensor, the fifth sensor, and the sixth sensor collectively track the location and pose of the first computing device relative to the structure.

20. The system of claim 19, wherein the second location-aware armature is configured to track the location and pose of the second computing device relative to the structure.

* * * * *